US009983684B2

(12) United States Patent
Wang et al.

(10) Patent No.: US 9,983,684 B2
(45) Date of Patent: May 29, 2018

(54) VIRTUAL AFFORDANCE DISPLAY AT VIRTUAL TARGET

(71) Applicant: MICROSOFT TECHNOLOGY LICENSING, LLC, Redmond, WA (US)

(72) Inventors: Jia Wang, Redmond, WA (US); Yasaman Sheri, Seattle, WA (US); Julia Schwarz, Redmond, WA (US); David J. Calabrese, Bellevue, WA (US); Daniel B. Witriol, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 12 days.

(21) Appl. No.: 15/341,957

(22) Filed: Nov. 2, 2016

(65) Prior Publication Data

US 2018/0120944 A1 May 3, 2018

(51) Int. Cl.
*G09G 5/00* (2006.01)
*G06F 3/01* (2006.01)
*G06F 3/03* (2006.01)
*G06T 19/00* (2011.01)

(52) U.S. Cl.
CPC .............. *G06F 3/017* (2013.01); *G06F 3/013* (2013.01); *G06F 3/0304* (2013.01); *G06T 19/006* (2013.01)

(58) Field of Classification Search
CPC ........ G06F 3/013; G06F 3/017; G06F 3/0304; G06T 19/006
USPC .................................................. 345/632, 633
See application file for complete search history.

(56) References Cited

U.S. PATENT DOCUMENTS

| 5,577,981 | A  | 11/1996 | Jarvik |
| 6,204,828 | B1 | 3/2001  | Amir et al. |
| 7,646,394 | B1 | 1/2010  | Neely, III et al. |
| 8,319,773 | B2 | 11/2012 | Fein et al. |
| 8,451,278 | B2 | 5/2013  | Geisner et al. |

(Continued)

OTHER PUBLICATIONS

Chatterjee, et al., "Gaze+Gesture: Expressive, Precise and Targeted Free-Space Interactions", In Proceedings of the ACM on International Conference on Multimodal Interaction, Nov. 9, 2015, 8 pages.

(Continued)

*Primary Examiner* — Ryan R Yang
(74) *Attorney, Agent, or Firm* — Alleman Hall Creasman & Tuttle LLP

(57) ABSTRACT

Methods and devices for displaying a virtual affordance with a virtual target are disclosed. In one example, the virtual target is displayed to a user via a display device. The user's point of gaze is determined to be at a gaze location within a target zone including the virtual target. The user's hand is determined to be at a hand location within a designated tracking volume. Based on at least determining that the user's gaze is at the gaze location and the user's hand is at the hand location, the virtual affordance is displayed at a landing location corresponding to the virtual target, where the landing location is independent of both the gaze location and the user's hand location. Movement of the user's hand is tracked and the virtual affordance is modified in response to the movement.

20 Claims, 14 Drawing Sheets

(56) References Cited

U.S. PATENT DOCUMENTS

| | | | |
|---|---|---|---|
| 8,963,805 | B2 | 2/2015 | Sugden et al. |
| 9,134,798 | B2 | 9/2015 | Morris et al. |
| 9,158,375 | B2 | 10/2015 | Maizels et al. |
| 9,202,306 | B2 | 12/2015 | Vesely et al. |
| 9,202,313 | B2 | 12/2015 | Bennet et al. |
| 9,218,063 | B2 | 12/2015 | Galor et al. |
| 2013/0154913 | A1 | 6/2013 | Genc et al. |
| 2013/0283208 | A1 | 10/2013 | Bychkov et al. |
| 2014/0033052 | A1 | 1/2014 | Kaufman et al. |
| 2014/0152558 | A1 | 6/2014 | Salter et al. |
| 2014/0184550 | A1 | 7/2014 | Hennessey et al. |
| 2014/0317576 | A1 | 10/2014 | Song et al. |
| 2015/0355805 | A1 | 12/2015 | Chandler et al. |
| 2016/0027216 | A1 | 1/2016 | da Veiga et al. |
| 2017/0337742 | A1* | 11/2017 | Powderly .............. G06T 19/006 |

OTHER PUBLICATIONS

Carter, et al., "Remote Gaze and Gesture Tracking on the Microsoft Kinect: Investigating the Role of Feedback", In Proceedings of the Annual Meeting of the Australian Special Interest Group for Computer Human Interaction, Dec. 7, 2015, pp. 167-176.

Kip, et al., "Leap Motion", Retrieved on: Jul. 28, 2016 Available at: https://developer.leapmotion.com/gallery/ui-input-module.

Poupyrev, et al., "The Go-Go Interaction Technique: Non-linear Mapping for Direct Manipulation in VR", In Proceedings of the 9th annual ACM symposium on User interface software and technology, Nov. 6, 1996, 2 pages.

Pierce, et al., "Image Plane Interaction Techniques in 3D Immersive Environments", In Proceedings of the symposium on Interactive 3D graphics, Apr. 30, 1997, 6 pages.

Pierce, et al., "Voodoo Dolls: Seamless Interaction at Multiple Scales in Virtual Environments", In Proceedings of the symposium on Interactive 3D graphics, Apr. 26, 1999, 6 pages.

Bowman, Doug, "Cross-task 3D interaction with HOMER", Published on: Sep. 11, 2015 Available at: https://www.youtube.com/watch?v=V6Fo3iza5cY.

Olwal, et al., "The Flexible Pointer: An Interaction Technique for Selection in Augmented and Virtual Reality", In Proceedings of the 16th annual ACM Symposium on User Interface Software and Technology, Nov. 2, 2003, 2 pages.

Mine, Mark R., "Virtual Environment Interaction Techniques", In UNC Chapel Hill computer science Technical report TR95-018, May 5, 1995, pp. 1-18.

Hilliges, O. et al., "HoloDesk: Direct 3D Interactions with a Situated See-Through Display", In Proceedings of the SIGCHI Conference on Human Factors in Computing Systems (CHI '12), May 5, 2012, Austin, Texas, 10 pages.

McMahan, et al., "Chapter 12: Principles for Designing Effective 3D Interaction Techniques", Handbook of Virtual Environments Design, Implementation, and Applications, CRC Press, Sep. 10, 2014, 27 pages.

Kovács, P. et al., "Tangible Holographic 3D Objects with Virtual Touch", In Proceedings of the International Conference on Interactive Tabletops and Surfaces (ITS '15), Nov. 15, 2015, Funchal, Portugal, 6 pages.

* cited by examiner

VIRTUAL AFFORDANCE DISPLAY AT VIRTUAL TARGET

BACKGROUND

Augmented reality and virtual reality display devices may enable users to view and manipulate displayed virtual content. In some examples, a user may desire to interact with a virtual object or portion thereof using one or both of the user's hands.

SUMMARY

Methods, computing devices and head-mounted display devices for displaying a virtual affordance with a virtual target are disclosed herein. In one example, a method comprises displaying the virtual target to a user via a display device and determining that the user's point of gaze is at a gaze location within a target zone including the virtual target. A hand of the user is determined to be at a hand location within a designated tracking volume.

Based on at least determining that the user's point of gaze is at the gaze location and determining that the hand of the user is at the hand location, the virtual affordance is displayed at a landing location that is independent of both the gaze location within the target zone and the hand location within the designated tracking volume. Movement of the user's hand is tracked and the virtual affordance is modified in response to the hand movement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
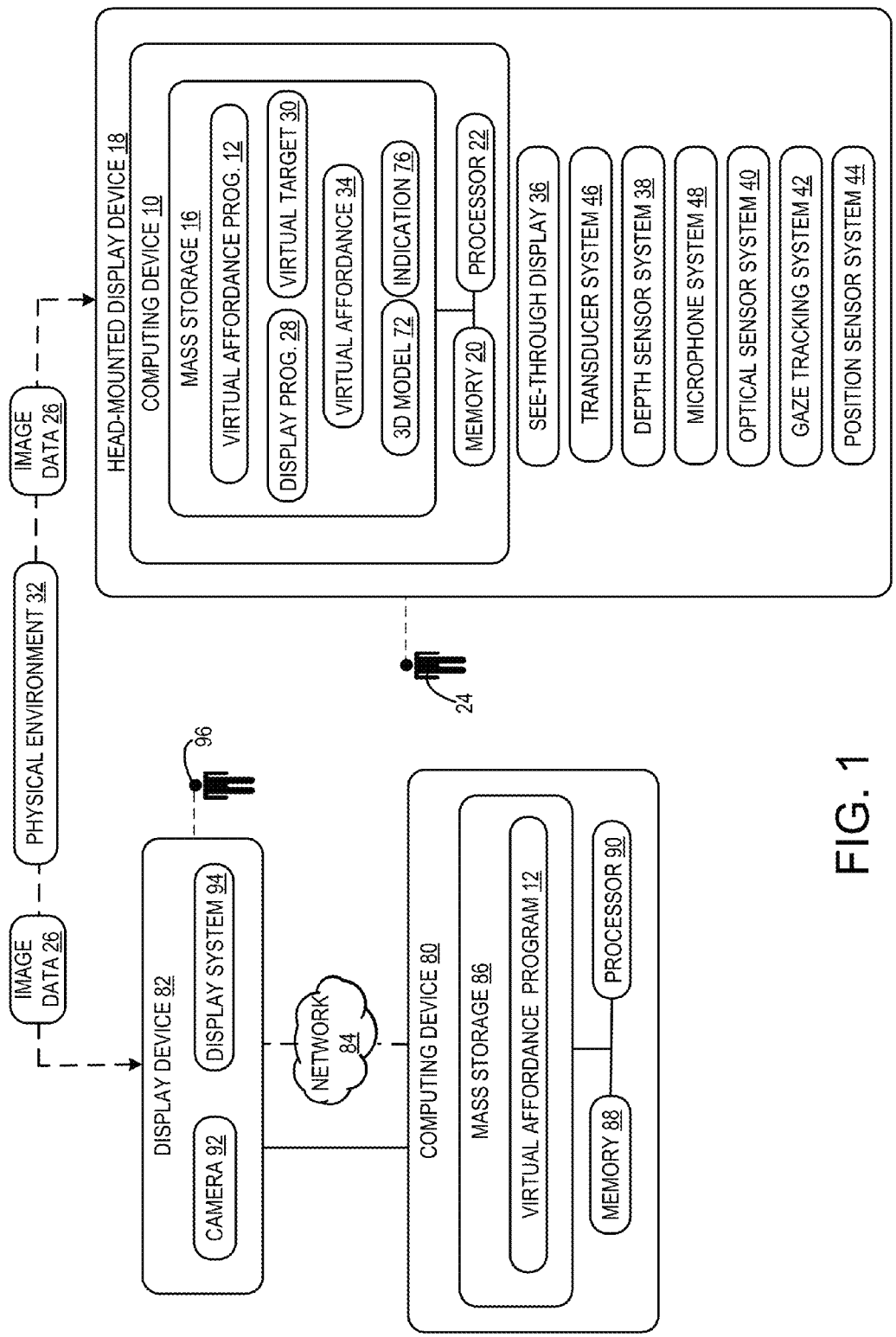
FIG. 1 is a schematic view of example computing devices and display devices that may display a virtual affordance with a virtual target according to examples of the present disclosure.

With some augmented reality and virtual reality display devices, a user may interact with virtual objects using hand motions, such as predefined gestures or other movements. For example, in some systems movement of a user's actual hand may be mapped to movement of a virtual affordance (such as a holographic hand) that is displayed to appear in a real world physical environment (via an augmented reality display) or is displayed in a fully virtual environment (via a virtual reality display).

In same examples, a user may manipulate a displayed virtual affordance to interact with one or more virtual objects by extending the user's arm and hand away from the user's body and using hand motions to control the virtual affordance and virtual object(s). Depending upon the location of the virtual object(s) in the real world physical environment or virtual environment, in some examples the user may hold her arm extended away from her body in a less than comfortable position and/or for a lengthy period of time.

In these and other example situations, over time the user may experience fatigue in continually extending her arm and moving and repositioning her arm and hand to correspondingly control movement and location of the virtual affordance. Additionally, where multiple virtual objects are displayed in various different locations, the additional movement and relocation of the user's arm and hand to correspondingly move a virtual affordance to spaced-apart virtual objects may further tire and fatigue the user's arm and hand.

In some example systems, a user may gaze at a virtual object to manipulate the object. For example, a gaze detection system may determine that a user is gazing at a virtual object. In some examples, by holding her gaze on the virtual object for a predetermined time, the user may trigger a selection command that enables the user to further manipulate the object with her gaze. However, such gaze-controlled interactions can provide an awkward and unnatural user experience.

The present disclosure is directed to methods, computing devices and display devices for displaying a virtual affordance with a virtual target using a combination of gaze detection and user hand manipulation that enables a natural and low-fatigue user experience. As described in more detail below, in some examples the methods and devices of the present disclosure may be utilized in an augmented reality environment in which a user vies a real world physical environment that includes virtual content displayed within the physical environment.

For example and as described in more detail below, a head mounted display (HMD) device may include a see-through display configured to visually augment a view of a real world three dimensional environment through the display, such as by displaying virtual content that appears within the real world environment. Other examples of displaying virtual content within a real world physical environment may include projection-based solutions, such as displays or projectors installed in a room that display virtual content within the room.

In some examples the methods and devices of the present disclosure may be utilized in a virtual reality environment in which a user vies a fully immersive environment of virtual content in which the user has no direct view of her surrounding real world physical environment. In some examples of virtual reality devices, sensors may capture image data from the physical environment and images corresponding to the physical environment may be displayed to the user. Other virtual content may be blended and displayed with the images of the user's real world environment.

With reference now to FIG. 1, a schematic view of example implementations of computing and display devices for displaying a virtual affordance with a virtual target is provided. In one example a computing device 10 is integrated into a head-mounted display (HMD) device 18. Computing device 10 may include a virtual affordance program 12 comprising instructions that may be stored in mass storage 16. The virtual affordance program 12 may be loaded into memory 20 and executed by a processor 22 to perform one or more of the methods and processes described herein. Additional details regarding the components and computing aspects of the computing device 10 are described in more detail below with reference to FIG. 12.

The HMD device 18 may create and display to a first viewer 24 an augmented reality environment comprising virtual content. The HMD device 18 may include a display program 28 that generates such virtual content for display via the HMD device. The virtual content may include one or more visual elements in the form of virtual targets 30, such as three-dimensional (3D) holographic objects and two-dimensional (2D) virtual images, that are generated and displayed to appear located within a real world physical environment 32 viewed through the device. In this manner, the HMD device 18 may create an augmented reality environment that enables the viewer to perceive such virtual targets 30 and other virtual content as positioned within the physical environment 32 surrounding the viewer.

In some examples the HMD device 18 may comprise an at least partially see-through display 36 that is supported in front of a user's eye or eyes, thereby giving the user a view of his or her surroundings. Any suitable display technology and configuration may be used to display images via the at least partially see-through display 36. For example, the at least partially see-through display 36 may be configured to enable a wearer of the HMD device 18 to view a physical, real-world object in the physical environment through one or more partially transparent pixels that are displaying a virtual object representation. The at least partially see -through display 36 may include image-producing elements such as, for example, a see-though Organic Light-Emitting Diode (OLED) display.

As another example, the HMD device 18 may include a light modulator on an edge of one or more at least partially see-through display panels. In this example, the panel(s) may serve as a light guide for delivering light from the light modulator to the eyes of a wearer. Such a light guide may enable a wearer to perceive virtual content located within the physical environment that the wearer is viewing. In other examples the display panels may utilize a liquid crystal on silicon (LCOS) display.

The HMD device 18 may include various sensors and related systems that receive physical environment data from the physical environment 32. For example, the HMD device 18 may include a depth sensor system 38 that generates depth image data. The depth sensor system 38 may include one or more depth cameras that capture image data 26 from the physical environment 32. In some examples the depth camera(s) may be an infrared time-of-flight depth camera. In other examples the depth camera(s) may take the form of a structured light depth camera. Any suitable depth tracking system and technology may be utilized.

In some examples the HMD device 18 may include an optical sensor system 40 that utilizes at least one outward facing sensor, such as an RGB camera, IR sensor or other optical sensor. The outward facing sensor may capture image data 26 in the form of color, IR or other light information from the physical environment 32.

In some examples, depth image data and/or other captured image data 26 may be used by the processor 22 to detect movements within a field of view of the HMD device 18. Examples of such movements include gesture-based inputs or other movements that are performed by a wearer (e.g., a pinching of fingers, closing of a fist, pointing with a finger or hand, etc.) and indicate an action to be taken, a selection of a virtual object displayed via the HMD device 18, or other user input. Additionally, and as described in more detail below, depth image data and/or other image data may be used to determine that a hand of the user is at a hand location within a designated tracking volume. Such determination then may be used along with gaze location information to trigger the display of a virtual affordance 34 at a landing location corresponding to a virtual target 30.

Data from the optical sensor system 40 also may be used by the processor 22 to determine direction/location and orientation data (e.g., from imaging environmental features) that enables position/motion tracking of the HMD device 18 in the real world physical environment 32. Such data also may be used to identify surfaces and/or measure one or more surface parameters of the physical environment 32.

Computing device 10 may receive gaze tracking data from a gaze tracking system 42 of the HMD device 18. In some examples, on or more inward-facing light sources and image sensors may collect image information that is used to measure gaze parameters of the user's eyes. Using this information, the processor 22 may execute instructions to determine a direction in which the user is gazing and/or to identify a physical object and/or virtual object at which the user is gazing. Using the gaze tracking data, the processor 22 may execute instructions to monitor the gaze location of a viewer within the physical environment 32 and relative to physical features and virtual content displayed within the physical environment. In other examples, any suitable gaze tracking technology may be utilized.

Additionally, and as described in more detail below, gaze tracking data may be used to determine that the user's point of gaze is at a gaze location within a target zone that includes a virtual target 30. Such determination then may be used along with other information to trigger the display of a virtual affordance 34 at a landing location corresponding to a virtual target 30.

The HMD device 18 may also include a position sensor system 44 comprising one or more accelerometers, gyroscopes, inertial measurement units, head tracking systems, and/or other sensors for determining a position and/or orientation of the device. The relative position and/or orientation of the HMD device 18 relative to the physical environment 32 may be assessed so that virtual content may be accurately displayed in desired real-world locations with desired orientations.

In some examples a 6 degree-of-freedom (6DOF) position sensor system may be used to display virtual content in a world-locked manner. A world-locked virtual object, such as a hologram, appears to be fixed relative to real world objects viewable through the HMD device 18, thereby enabling a wearer of the HMD device to move around a real world physical environment while perceiving the virtual object as remaining stationary in a fixed location and orientation in the physical environment.

In other examples, the HMD device 18 may operate in a body-lock display mode in which one or more virtual objects may be displayed via the HMD device with body-locked positions. In a body-locked position, a holographic object appears to be fixed relative to the wearer of the HMD device 18, and the body-locked position of the holographic object appears to be moveable relative to real-world objects.

The HMD device 18 may also include a transducer system 46 comprising one or more actuators that convert an electrical signal into another form of energy. In some examples, the transducer system 46 may include one or more speaker for providing audio feedback to a viewer. In other examples the transducer system 46 may include one or more tactile transducers for generating and providing haptic feedback to the viewer, such as vibrations. The HMD device 18 may also include a microphone system 48 and one or more microphones for receiving audio input from the physical environment.

In some examples, a 3D model 72 of at least a portion of the physical environment 32 may be generated by HMD device 18 and utilized to display and manipulate virtual content such as virtual targets 30 and virtual affordances 34 within the physical environment. The 3D model may include surface reconstruction information that may be used to identify physical features, such as objects and surfaces, in the physical environment.

The example illustrated in FIG. 1 shows the computing device 10 integrated into the HMD device 18. In other examples the computing device 10 may be a separate component from the HMD device 18 and communicatively coupled to the HMD device. Additionally, many types and configurations of HMD devices 18 having various form factors may be used and are within the scope of the present disclosure. In some examples, one or more of the above-described sensor systems or other data gathering systems may be located externally to the HMD device 18.

With continued reference to FIG. 1, an example of a computing device 80 that is physically separated from a display device 82 also is shown. In this example, the computing device 80 may comprise or be integrated into a separate device, such as a set-top box, gaming console, or other like device that does not include an integrated display. The computing device 80 may be operatively connected with the display device 82 using a wired connection, or may employ a wireless connection via WiFi, Bluetooth, or any other suitable wireless communication protocol. For example, the computing device 80 may be communicatively coupled to a network 84. The network 84 may take the form of a local area network (LAN), wide area network (WAN), wired network, wireless network, personal area network, or a combination thereof, and may include the Internet. Additional details regarding the components and computing aspects of the computing device 80 are described in more detail below with reference to FIG. 12.

As with computing device 10, computing device 80 may include a virtual affordance program 12 that may be stored in mass storage 86. The virtual affordance program 12 may be loaded into memory 88 and executed by a processor 90 to perform one or more of the methods and processes described in more detail below.

The example display device 82 may include a camera 92 for capturing image data 26 of the physical environment 32 and a display system 94 for presenting visual content to a second viewer 96. In some examples, the display device 82 may include one or more of the gaze tracking, sensor, transducer, and microphone systems of the HMD device 18 described above. In other examples, the computing device 80 may comprise or be integrated into the display device 82.

In other examples, the computing device 80 and display device 82 may comprise a virtual reality display system in the form of a head-mounted, fully immersive display device that creates a completely virtual environment of virtual content in which the user has no direct view of her surrounding real world physical environment.

Figure 2:
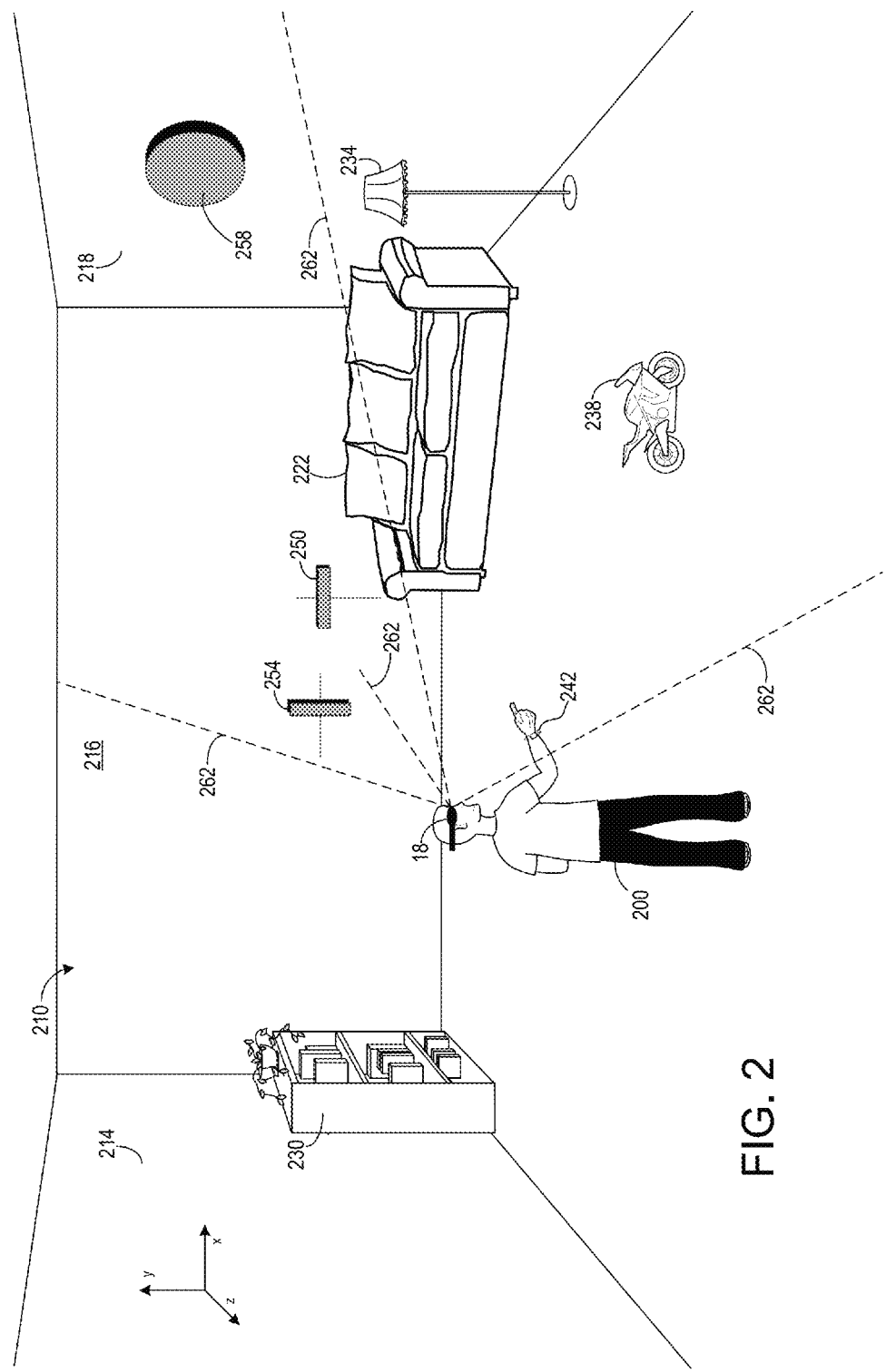
FIG. 2 shows a user wearing a head-mounted display device of FIG. 1 in a real world physical environment according to an example of the present disclosure.

With reference now to FIGS. 2-10, descriptions of example use cases of the present disclosure will now be provided. FIG. 2 is a schematic illustration of a user 200 wearing HMD device 18 and standing in the real world physical environment of room 210. The room 210 includes a number of physical objects and surfaces, such as walls 214, 216 and 218, couch 222, bookcase 230, and lamp 234. HMD device 18 may display to user 200 virtual content that appears to be located at different three-dimensional locations within room 210.

In the example of FIG. 2, HMD device 18 displays virtual content in the form of a holographic motorcycle 238 and virtual targets in the forms of interactive holographic sliders 250, 254 and an interactive holographic push-button 258. In some examples one or more of the holographic motorcycle 238, interactive holographic sliders 250, 254 and interactive holographic push-button 258 may be displayed in a world-locked manner. The HMD device 18 may have a field of view, indicated by dotted lines 262, that defines a volume of space in which the user may view virtual content displayed by the device. In different examples of HMD devices 18, the field of view may have different shapes, such as cone-shaped, frustum-shaped, pyramid-shaped, or any other suitable shape. In different examples of HMD devices 18, the field of view also may have different sizes that occupy different volumes of space.

As described in more detail below, the interactive holographic sliders 250, 254 and interactive holographic push-button 258 are virtual targets configured to receive user input via a virtual affordance displayed by the HMD device 18 and manipulated by the user 200. In other examples, any other suitable types or forms of virtual targets configured to receive user input via a virtual affordance may be utilized, such as a two-position, three-position or other multi-position switches, control knobs or other input mechanisms.

Figure 3:
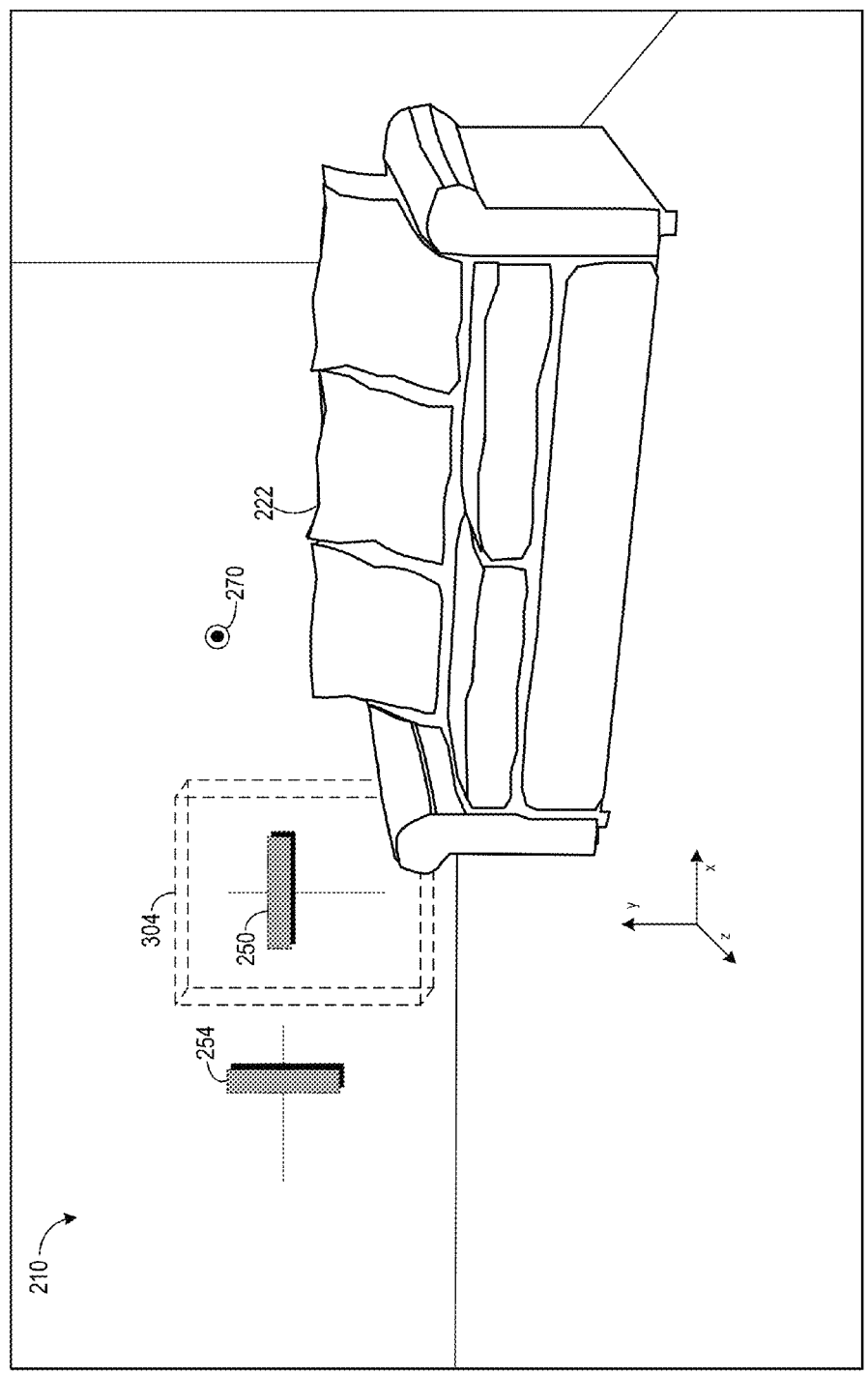
FIG. 3 shows examples of interactive virtual targets displayed in the real world physical environment of FIG. 2 according to an example of the present disclosure.

To interact with a particular virtual target, initially the user 200 may direct his gaze toward the desired virtual target. With reference now to FIG. 3, this figure shows the couch 222 and interactive holographic sliders 250 and 254 as viewed by the user 200 through the HMD device 18. The gaze tracking system 42 of the HMD device 18 may track the location of the user's point of gaze, with the user's current gaze location indicated by identifier 270. In some examples, gaze location identifier 270 may be displayed by HMD device 18 to the user 200 to allow the user to visualize his gaze location within the room 210. In other examples the gaze location identifier may not be displayed to the user 200.

In some examples, a virtual target zone may surround one or more virtual targets. The target zone may be a predetermined area or volume of space located in a world-locked location that encompasses a world-locked virtual target. In some examples a target zone may be predefined by a developer of an application or other program that is executed by the processor 22 of the HMD device 18. In other examples, a target zone may be determined by the virtual affordance program 12. In some examples, the size and/or shape of a target zone may be determined based on a size and/or shape of the corresponding virtual target. As described in more detail below, when the location of a user's point of gaze is within a target zone, such gaze location combined with data related to the user's hand may cause the HMD device 18 to display a virtual affordance at a landing location associated with the virtual target.

As shown in the example of FIG. 3, a rectangular cuboid target zone 304 surrounds the interactive holographic slider 250. As indicated above, in other examples other shapes and/or sizes of target zones may be utilized. In some examples, because the user's current point of gaze is at a gaze location that is outside the target zone 304, the target zone 304 is not displayed to the user by the HMD device 18. In this manner, the user may experience a more visually pleasing and less visually cluttered environment while looking about the room 210.

Figure 4:
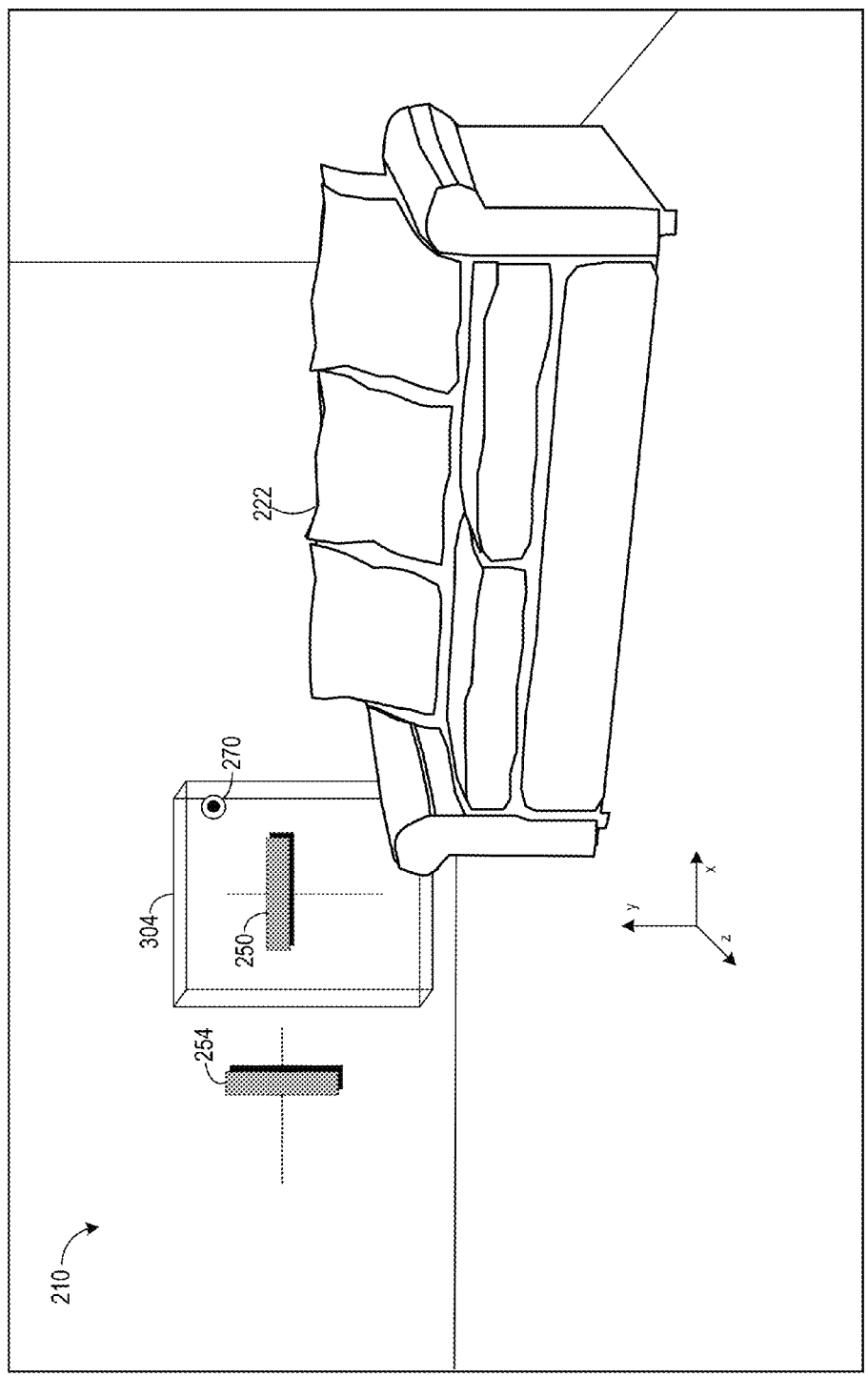
FIG. 4 shows an indication of a target zone displayed according to an example of the present disclosure.

With reference now to FIG. 4, the user 200 has moved his gaze location/identifier 270 to be within the target zone 304. Additionally, the user 200 is holding both hands down to his side at locations outside of a designated tracking volume that is described in more detail below. Based on determining that the user's point of gaze is at a gaze location within the target zone 304, the HMD device 18 may display an indication of the target zone 304 to the user.

In the example of FIG. 4, the indication of the target zone 304 comprises a holographic transparent outline of the boundaries of the rectangular cuboid target zone 304. In other examples, the indication may take the form of a visually highlighted volume of space corresponding to the target zone 304 or any other suitable visual depiction that conveys to the user the shape and size of the target zone. By displaying an indication of the target zone 304, the HMD device 18 may provide a visual cue to the user 200 that focuses attention to the region near the holographic slider 250 when the user's gaze location enters the target zone.

Additionally, and with reference also to FIG. 3 in which the user's gaze location/identifier 270 is outside the target zone 304, by not displaying an indication of the target zone until the user's gaze enters the target zone, the user may experience a more visually pleasing and less visually cluttered environment while looking about the room 210. In other examples, an indication of the target zone 304 may be continually displayed regardless of the user's gaze location.

Figure 5:
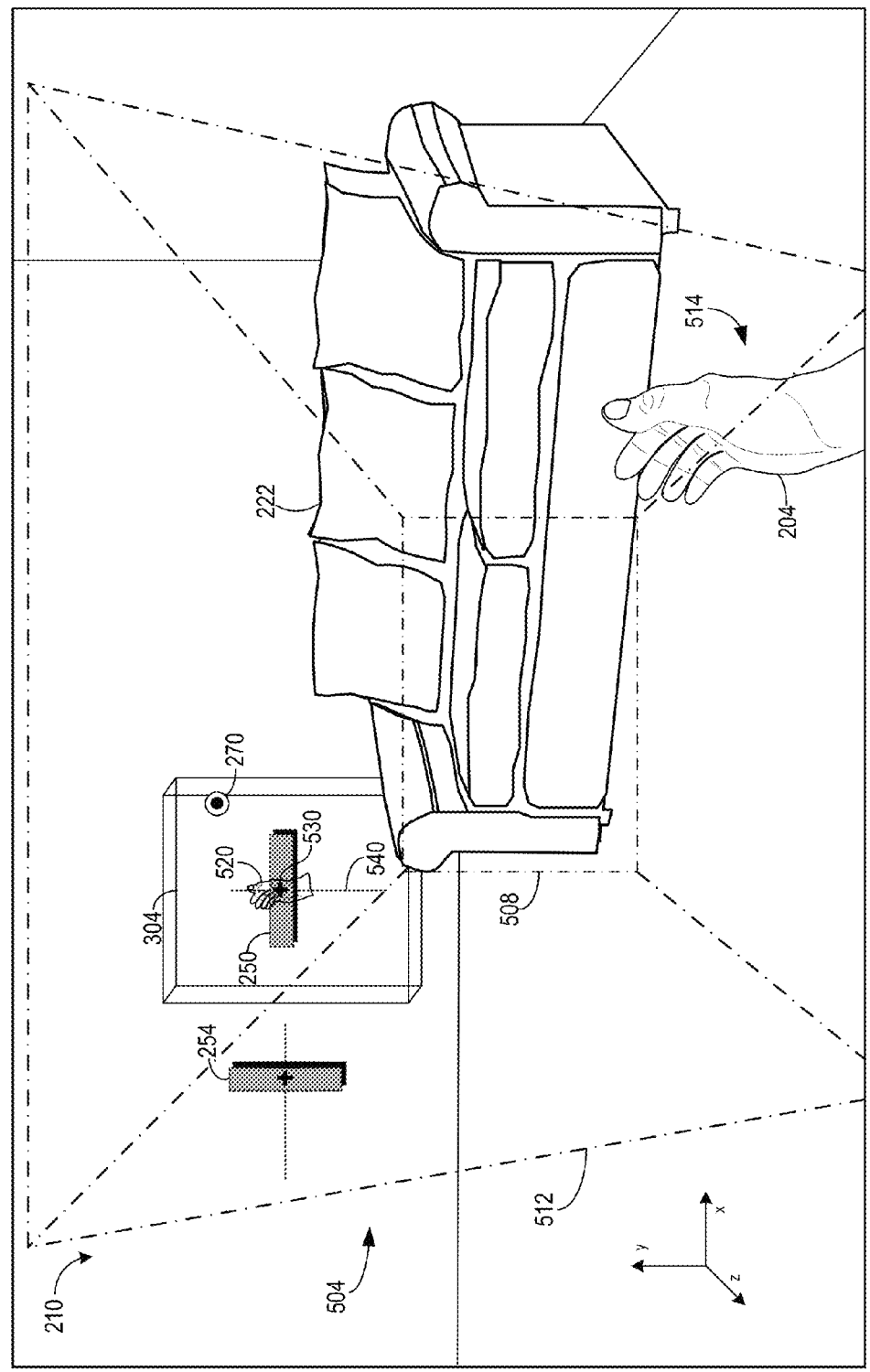
FIG. 5 shows a virtual affordance displayed at a landing location according to an example of the present disclosure.

With reference to FIG. 5, the user has raised his right hand 204 such that it is visible through the HMD device 18. In some examples, the HMD device 18 may define a designated tracking volume within which the HMD device may track the location and movement a user's hands and at least portions of a user's arms. In some examples and with reference to FIG. 1, the designated tracking volume may be the field of view 262 of the HMD device 18.

In some examples and with reference to FIG. 5, the designated tracking volume may be a portion of the field of view 262 of the HMD device 18. In some examples where the designated tracking volume is a portion of the field of view 262, the designated tracking volume may be a region of space located relative to the HMD device 18 within which an accuracy and/or fidelity of object location tracking exceeds a predetermined threshold. In the example of FIG. 5, the designated tracking volume 504 is a frustum that defines a portion of the field of view 262 of the HMD device 18. In this example, the designated tracking volume 504 is a frustum comprising a smaller rectangular near plane 508 that is spaced from the HMD device 18, and a larger rectangular far plane 512 (a lower portion of which is out of view) spaced from the near plane 508. In other examples, a designated tracking volume may have any other suitable shape and size.

In some examples, a position-sensing hand-held controller or a wearable computing device, such as watch 242 in FIG. 2, may be utilized by the user and communicatively coupled to the HMD device 18. In this manner, the HMD device 18 may track the hand-held controller or wearable computing device to determine the location and movement of the user's hand. For example, a hand-held controller or wearable computing device may comprise a 6DOF position sensor system that is communicatively coupled to the HMD device 18 to provide location and orientation information to the device.

With reference to the example of FIG. 5, the HMD device 18 determines that the user's right hand 204 is at a hand location 514 that is within the designated tracking volume 504. The user's point of gaze/identifier 270 is also determined to be within the target zone 304. In some examples, this combination of user inputs may signal that the user 200 desires to interact with the interactive holographic slider 250 located within the target zone 304.

Accordingly, and based on determining that the user's point of gaze is at a gaze location within the target zone 304, and determining that the user's right hand 204 is at the hand location 514 within the designated tracking volume 504, the virtual affordance program 12 may cause HMD device 18 to display a virtual affordance at a landing location 530 corresponding to the interactive holographic slider 250. In this example, the virtual affordance comprises a holographic hand 520. As described in more detail below, various other types and forms of virtual affordances also may be utilized.

In some examples, the virtual affordance is not displayed when either (1) the user's hand is not within the designated tracking volume 504 or (2) the user's point of gaze is not within the target zone 304. In these examples, by foregoing the display of the virtual affordance when either of these conditions exists, the user may comfortably gaze around her surrounding environment with less visual clutter.

As described in more detail below, the landing location may be located at or near the corresponding holographic slider 250 to thereby enable quick user selection and/or interaction with the slider. Additionally, the landing location is independent of both the location of the user's right hand 204 within the designated tracking volume and the user's gaze location in the target zone 304. In other words, the landing location corresponding to the interactive holographic slider 250 is unrelated to the location at which the user's hand enters the designated tracking volume, and unrelated to the location at which the user's hand is otherwise located in the designated tracking volume. Similarly, the landing location is unrelated to the location at which the user's gaze enters the target zone 304, and unrelated to the location at which the user's gaze is otherwise located in the target zone.

In this manner, as soon as it is determined that the user's point of gaze is within the target zone 304 and the user's hand is within the designated tracking volume 504, the virtual affordance program 12 displays the holographic hand 520 at the landing location corresponding to the interactive holographic slider 250. As described in more detail below, once the holographic hand 520 is displayed at the landing location, the user may now control movement of the holographic hand by moving the user's hand. The display of the holographic hand 520 is thereby modified in response to the movement of the user's hand.

The landing location at which a virtual affordance is displayed may be established by the virtual affordance program 12. In some examples, such as the example shown in FIG. 6, the landing location may comprise a location at which the virtual affordance at least partially overlaps the virtual target. In some examples, the landing location may be a location on a surface of the virtual target. In one example, the virtual affordance program 12 may establish the landing location by determining a center of virtual target and establishing the landing location at that center. In other examples, a predetermined landing location may be predefined by a developer of an application or other program that is executed by the processor 22 of the HMD device 18.

In the example of FIG. 5, the landing location 530 is indicated by a plus sign located at the center of the interactive holographic slider 250. The landing location 530 may be spaced from the surface of the holographic slider 250 in the z-axis direction such that the holographic hand 520 is displayed to float just in front of the slider in the 3D model of the room 210. For example, the landing location 530 may be spaced from the surface of the holographic slider 250 in the z-axis direction by 3 cm., 5 cm., 7 cm., or any other suitable distance that enables quick engagement between the holographic hand 520 and the slider.

In other examples, a landing location may be located adjacent to a virtual target such that a small movement of the user's hand will move the virtual affordance to overlap the virtual target. Accordingly, by displaying the virtual affordance at a landing location as described above, the HMD device 18 enables a user to quickly position the virtual affordance at a location relative to an interactive virtual target that allows for quick selection and interaction with minimal additional movement or other input from the user.

In some examples, the landing location may be determined by the shape and/or interaction property of the virtual target. In these examples and based on the shape and/or interaction property of the virtual target, the landing location may be determined in a manner that optimizes the ability of the user to quickly and conveniently interact with the virtual target with minimal hand motion that causes minimal hand fatigue. For example and with reference to FIG. 5, the landing location 530 indicated by the plus sign is located at the center of the interactive holographic slider 250, whereby the holographic hand 520 is displayed over the center of the slider. In this manner, the user may immediately engage with the slider 250 without additional movement of his hand 204, thereby also reducing hand fatigue.

In another example, the virtual target may comprise a holographic light switch that may be flipped up and down to toggle a light on and off. In this example, the landing location may be determined based on the interaction property of the light switch. Accordingly, the landing location may be located at the end of the switch that moves about an arc between the on and off positions. In this manner and regardless of the position of the switch, by displaying the holographic hand 520 at this landing location, the user may easily and immediately engage with the switch to turn it on or off upon display of the holographic hand.

In some examples, upon displaying the holographic hand 520 at the landing location 530 corresponding to the interactive holographic slider 250, the holographic hand may be engaged with the slider such that movement of user's right hand 204 in an up/down y-axis direction causes corresponding up/down y-axis movement of the slider along its axis of movement 540. In other examples, the holographic hand 520 may not be engaged with the holographic slider 250 upon the hand's initial display. In these examples, the user 200 may provide additional input to trigger such engagement. In some examples, the user 200 may perform a predetermined gesture that triggers engagement between the holographic hand and the holographic slider 250. In other examples, any other suitable form of user input may be utilized to trigger such engagement.

Figure 6:
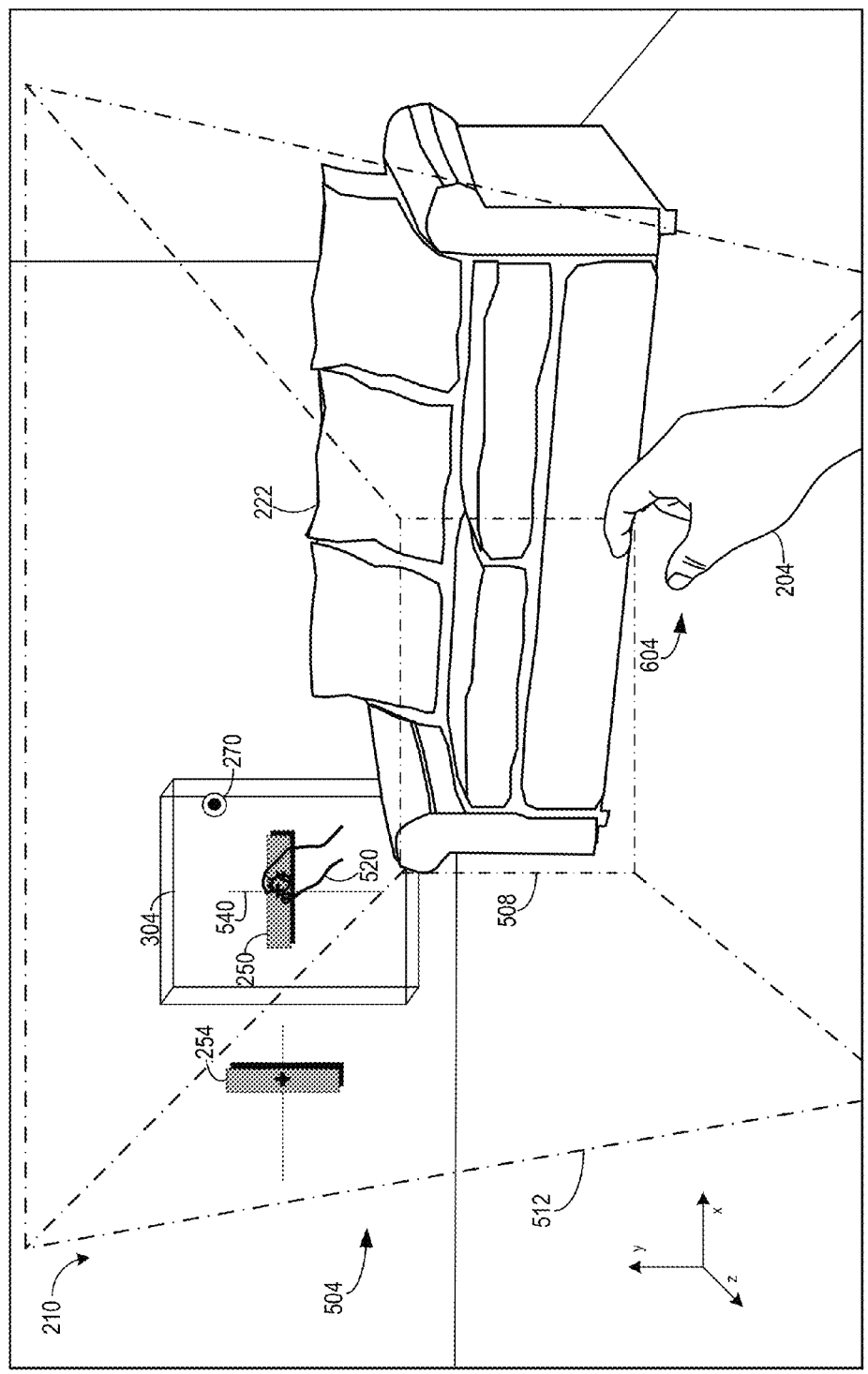
FIG. 6 shows the virtual affordance engaging with the virtual target in response to movement of the user's hand according to an example of the present disclosure.

With reference to FIG. 6, in one example the user may make a pinch gesture 604 with the index finger and thumb of the user's right hand 204. The HMD device 18 may track such movement of the user's right hand 204. In some examples and as shown in FIG. 6, the HMD device 18 may corresponding modify the holographic hand 520 to form a similar pinch gesture.

Figure 7:
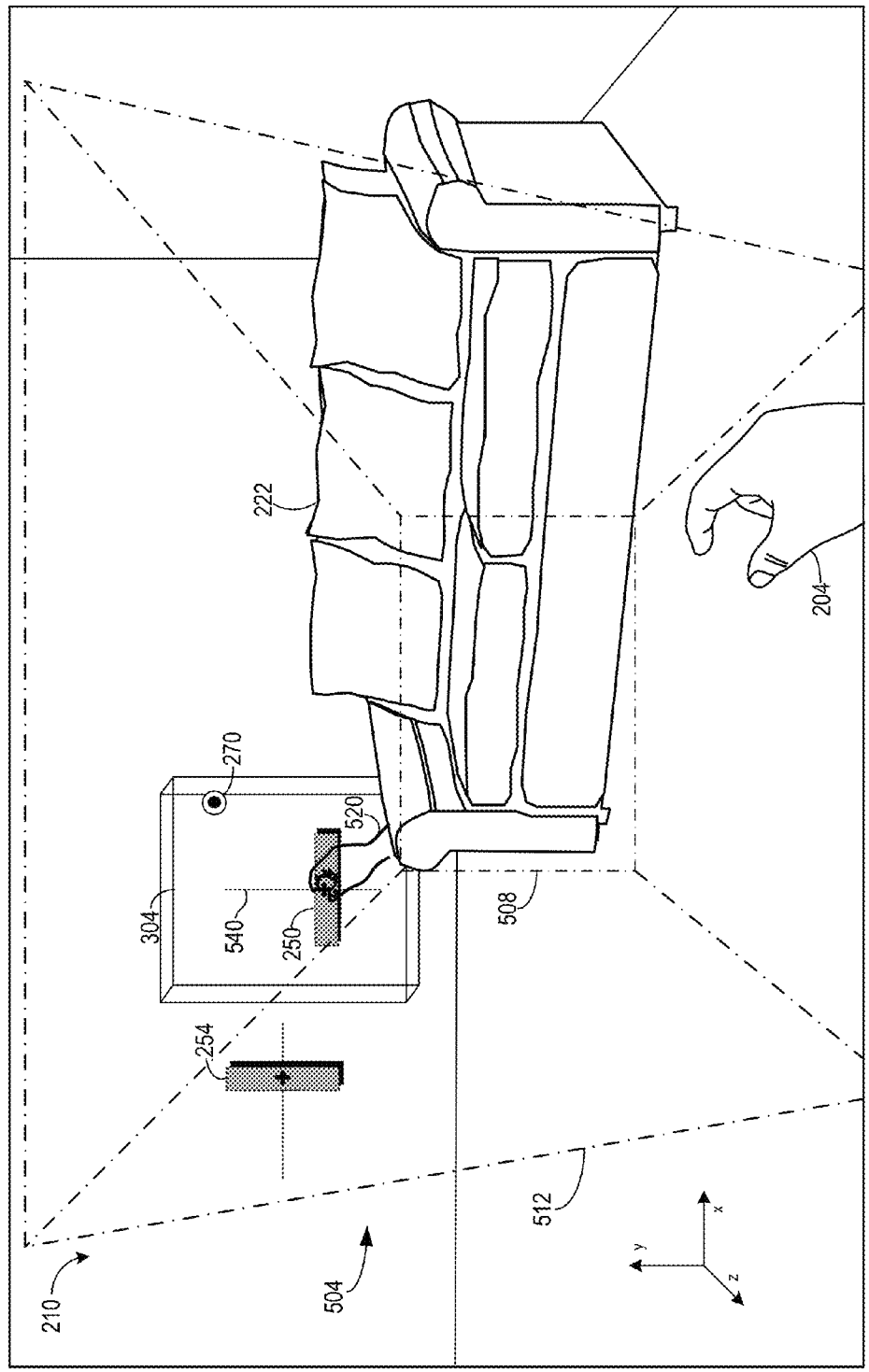
FIG. 7 shows the virtual affordance and virtual target moving in response to movement of the user's hand according to an example of the present disclosure.

In response to the pinch gesture made by the user's right hand 204, the HMD device 18 may effect engagement between the holographic hand 520 and the holographic slider 250 such that movement of the holographic hand in an up/down y-axis direction by the user causes corresponding up/down y-axis movement of the slider along its axis of movement 540. For example and as shown in FIG. 7, the user 200 has moved his right hand 204 downwardly in a negative y-axis direction to cause the holographic hand 520 and holographic slider 250 to correspondingly move downwardly in the negative y-axis direction.

The interactive holographic slider 250 may be configured to control another device or mechanism, or to control other virtual content, such as avatars in an augmented reality game. For example, the user 200 may manipulate the y-axis position of the interactive holographic slider 250 along its axis 540 to brighten or dim light output from the lamp 234 of FIG. 2. Similarly, other interactive virtual targets may be configured to control other devices, mechanisms, virtual content, and the like.

In the example of FIG. 5, the virtual affordance comprises a holographic hand 520 that resembles the current posture of the user's right hand 204. The display of the virtual affordance may be modified to match the changing movement, orientation and articulation of the user's right hand 204. In other examples, the virtual affordance may take a variety of other forms and shapes, such as a stylized hand image, an articulated hand representation, a simple pointer in the shape of an arrow, and any other suitable pointer, cursor, indicator and the like.

In some examples, when it is determined that the user's point of gaze is within the target zone 304 and the user's hand is within the designated tracking volume 504, the virtual affordance program 12 may not display the virtual affordance at the landing location until additional data is received or determined. For example, in some examples the user 200 may be actively moving his hand within the designated tracking volume 504, perhaps suggesting that the user may be engaged in another activity or otherwise less focused on the interactive holographic slider 250 in the target zone 304.

Accordingly and in some examples, when it is determined that the user's point of gaze is at a gaze location within the target zone 304 and the user's hand is within the designated tracking volume 504, the virtual affordance program 12 may not display the virtual affordance at the landing location until the user's hand has moved less than a predetermined amount over a predetermined time period. In one example, the movement of the user's hand may be tracked to determine if the user's hand has moved less than 5 centimeters over the previous 0.5 seconds. In other examples, the predetermined amount may be 1 cm., 3 cm., 7 cm. or any other suitable distance. In other examples, the predetermined time period may be 0.1 secs, 0.3 secs, 0.7 secs, 1.0 sec or any other suitable time period.

In some examples, the virtual affordance program 12 may constrain the movement and location of the holographic hand 520 to stay within boundaries of the target zone 304. In this manner, once the holographic hand 520 is displayed within the target zone 304, it will remain located within the target zone regardless of the position of the user's right hand 204 and, for example, until another input from the user removes such a constraint or causes the HMD device 18 to cease displaying the holographic hand 520.

Figure 8:
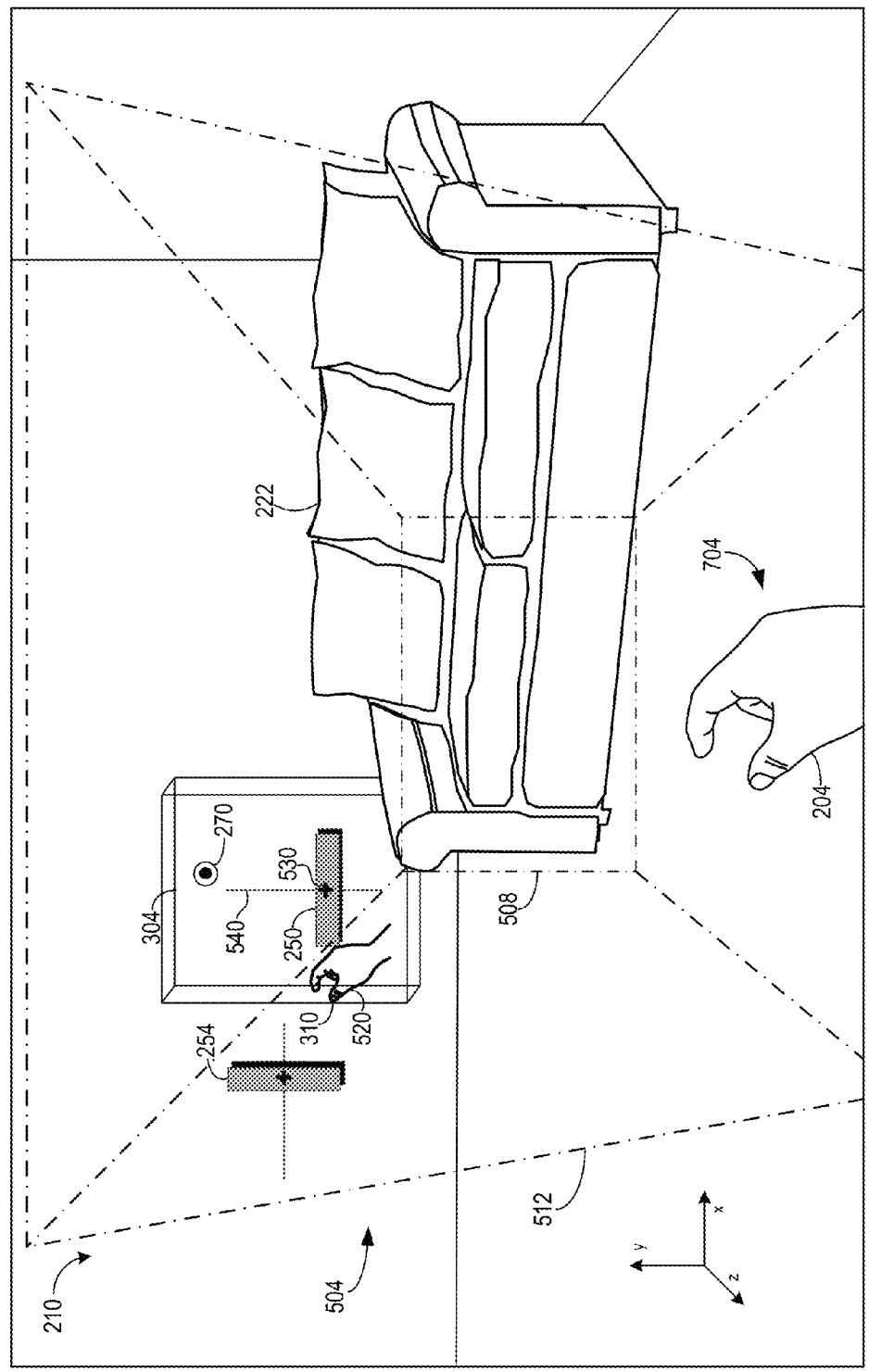
FIG. 8 shows the virtual affordance moving in a direction to a boundary of the target zone in response to movement of the user's hand according to an example of the present disclosure.

In one example and with reference now to FIG. 8, after moving the holographic slider 250 downwardly, the user 200 may move his right hand 204 leftwardly in a negative x-axis direction to the first adjusted location 704. The HMD device 18 may use captured image data to track such movement of the user's right hand 204. Correspondingly, the HMD device 18 displays the holographic hand 520 moving leftwardly to a boundary 310 of the target zone 304.

Figure 9:
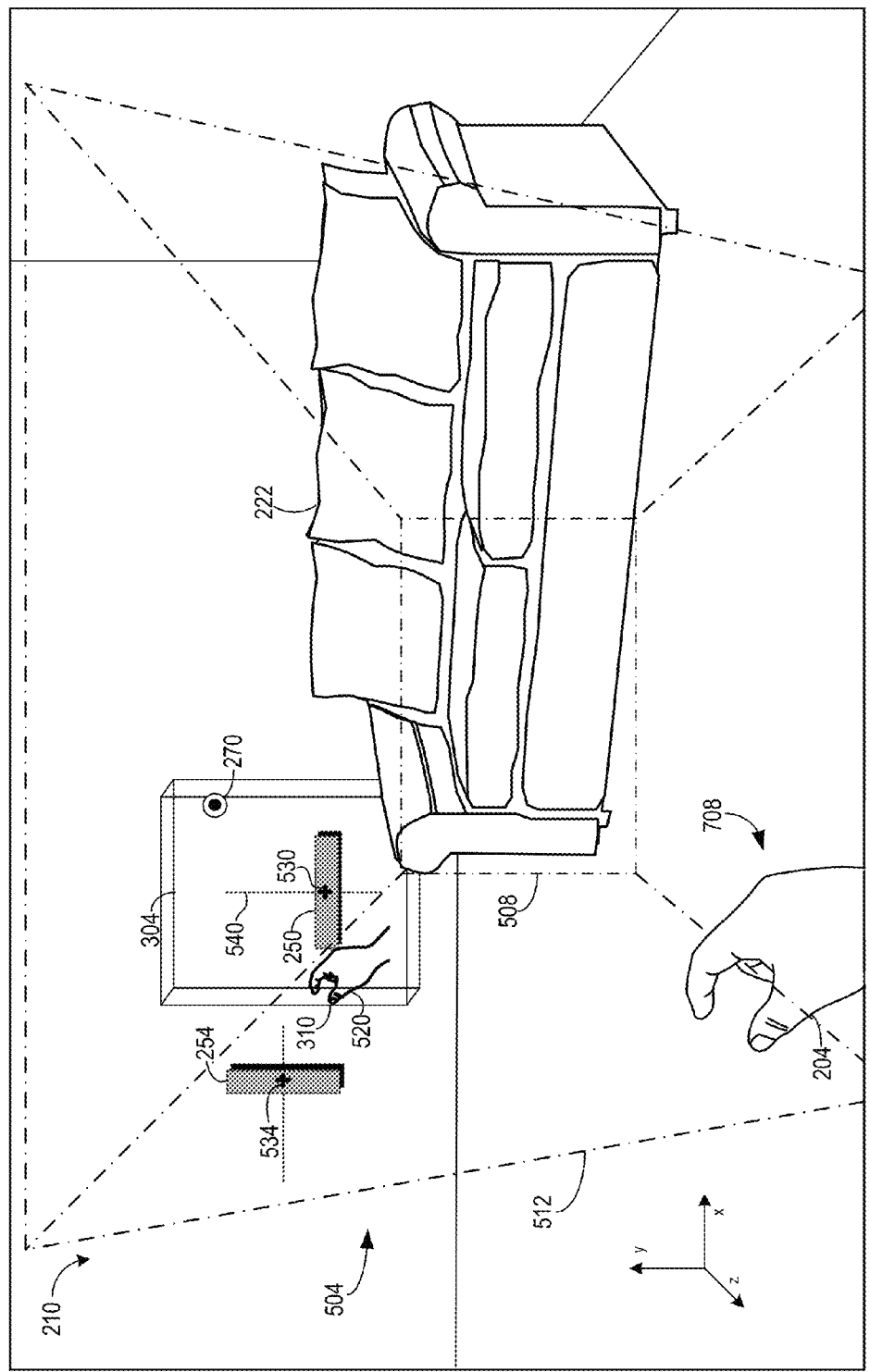
FIG. 9 shows the user's hand continuing to move in the direction while the virtual affordance remains at the boundary of the target zone according to an example of the present disclosure.

With reference now to FIG. 9 and using additional captured image data, the HMD device 18 may continue to track the user's hand 204 moving in the negative x-axis direction from the first adjusted location 704 to a second adjusted location 708. In this example, the virtual affordance program 12 has constrained the movement and location of the holographic hand 520 to stay within boundaries of the target zone 304. Accordingly, despite the continued movement of the user's right hand 204, the holographic hand 520 remains displayed at the boundary 310 of the target zone 304.

In another example and with reference again to FIG. 8, the user's hand 204 is at the first adjusted location 704 and the holographic hand 520 is displayed at the boundary 310 of the target zone 304. In this example, when the HMD device 18 subsequently tracks the user's hand 204 moving from the first adjusted location 704 leftwardly in the negative x-axis direction (which would otherwise move the holographic hand 520 beyond the boundary 310 of the target zone 304), the virtual affordance program 12 controls the HMD device 18 to reset the location of the holographic hand 520 to the landing location 530 corresponding to the holographic slider 250. In this example, the holographic hand is conveniently repositioned to the landing location 530 for quick access to the holographic slider 250.

In some examples, the virtual affordance program 12 may constrain the holographic hand 520 to move along an axis of the virtual target. In this manner, once the holographic hand 520 is engaged to control the virtual target at the landing location, movement of the corresponding hand of the user along the axis of the virtual target will cause corresponding movement of both the virtual affordance and the virtual target along that axis, while movement of the corresponding hand of the user along another axis different from the axis of the virtual target will not cause corresponding movement of the virtual affordance or the virtual target along that different axis.

In one example and with reference to FIG. 7, movement of the user's right hand 204 in the y-axis direction causes corresponding movement of both the holographic hand 520 and the holographic slider 250 along the parallel vertical axis 540 of the slider, while movement of the user's right hand 204 in the x-axis or z-axis directions will not cause corresponding movement of the holographic hand 520 or the holographic slider 250 in either of these directions.

In some examples, the HMD device 18 may determine that the user's point of gaze has exited the target zone. This may indicate that the user no longer desires to interact with the virtual target(s) located in the target zone. Accordingly and in some examples, in response to determining that the user's point of gaze has exited the target zone, the virtual affordance program 12 may cause the HMD device 18 to cease displaying the virtual affordance.

In some examples and as noted above, the HMD device 18 may utilize captured image data to determine the location of the hand of the user. For example, the depth sensor system 38 may include an image sensor that captures image data of the hand. In some examples, when the user's hand is outside the designated tracking volume, the HMD device 18 may operate the image sensor at a first capture rate, such as 30 frames-per-second (fps). When the hand of the user is within the designated tracking volume, the HMD device 18 may operate the image sensor at a second capture rate greater than the first capture rate. In one example, the second capture rate may be 40 fps. Any other suitable capture rates for the slower first capture rate and the faster second capture rate may be utilized.

By increasing the capture rate of the image sensor in this manner, the depth sensor system 38 may provide greater accuracy in tracking the location, movement and orientation of the user's hand when the hand is within the designated tracking volume. Additionally, by operating the image sensor at a slower capture rate when the hand is outside the designated tracking volume, resources associated with sensor operation, such as power consumption and computational bandwidth, may be conserved.

Figure 10:
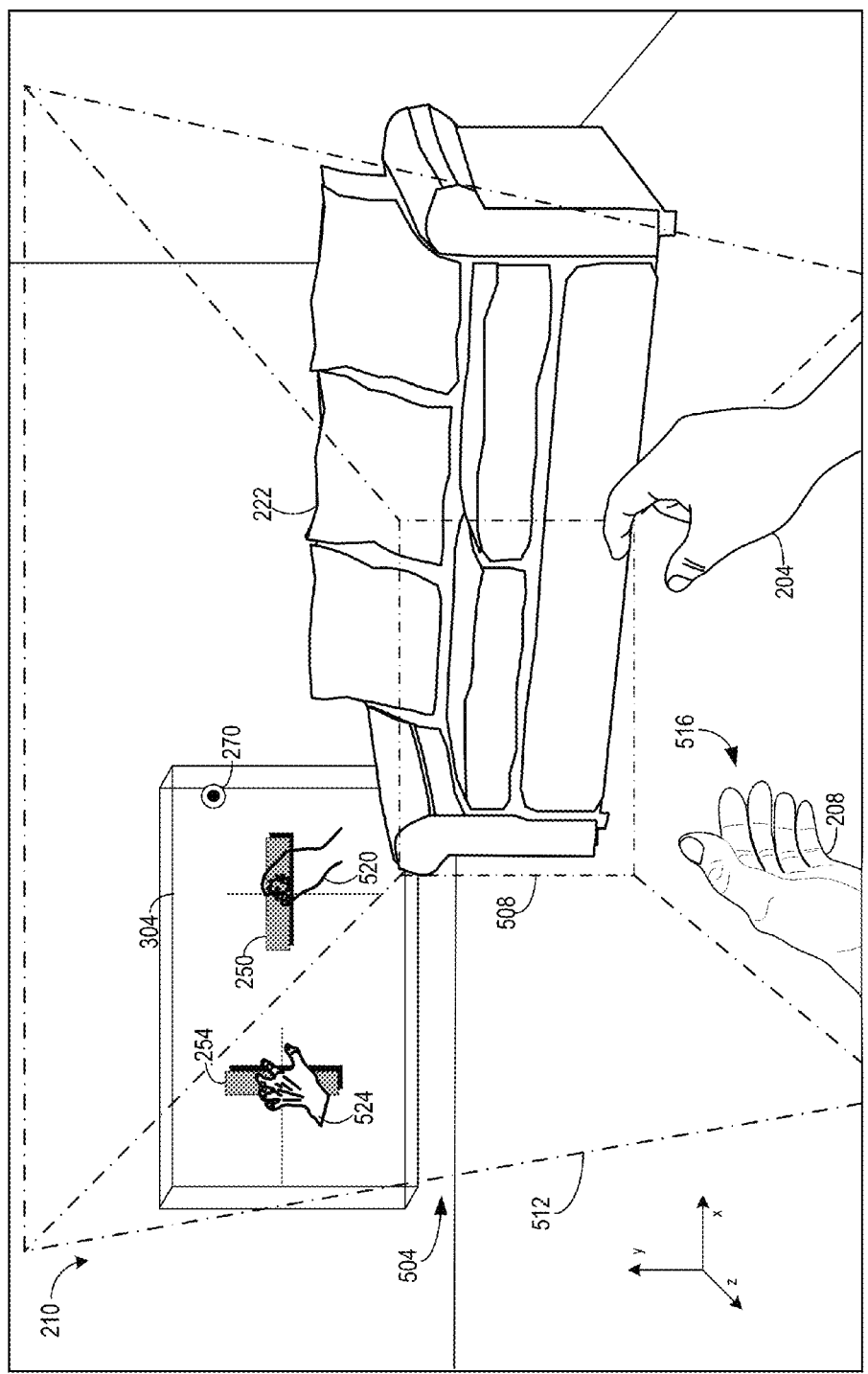
FIG. 10 shows a second virtual affordance being displayed with a second virtual target according to an example of the present disclosure.

In some examples, the HMD device 18 may track the location and movement of both the right hand and left hand of a user, and may display both a right hand virtual affordance and a separate left hand virtual affordance in response to the movement of the user's right and left hands. For example and with reference to FIG. 10, the virtual affordance program 12 may determine that a left hand 208 of the user 200 is at a left hand location 516 within the designated tracking volume 504. As shown in FIG. 10, in this example the target zone 304 includes both of the interactive holographic sliders 250, 254.

With reference to the descriptions above, based on determining that the user's point of gaze is at the gaze location/identifier 270 within the target zone 304, and determining that the left hand 208 of the user is at the left hand location 516 within the designated tracking volume 504, the virtual affordance program 12 may display a left hand virtual affordance 524 at a left hand landing location 534 (see FIG. 9) via the HMD device 18. The left hand landing location 534 is independent of both the user's gaze location within the target zone 304 and his left hand location within the designated tracking volume 504. As described above for the user's right hand 204, the HMD device 18 then may track movement of the user's left hand 208 and modify the display of the left hand virtual affordance 524 in response to the movement of the user's left hand. In this manner, the user 200 may use both left and right hands to interact with virtual targets in the manners described herein.

Figure 11A:
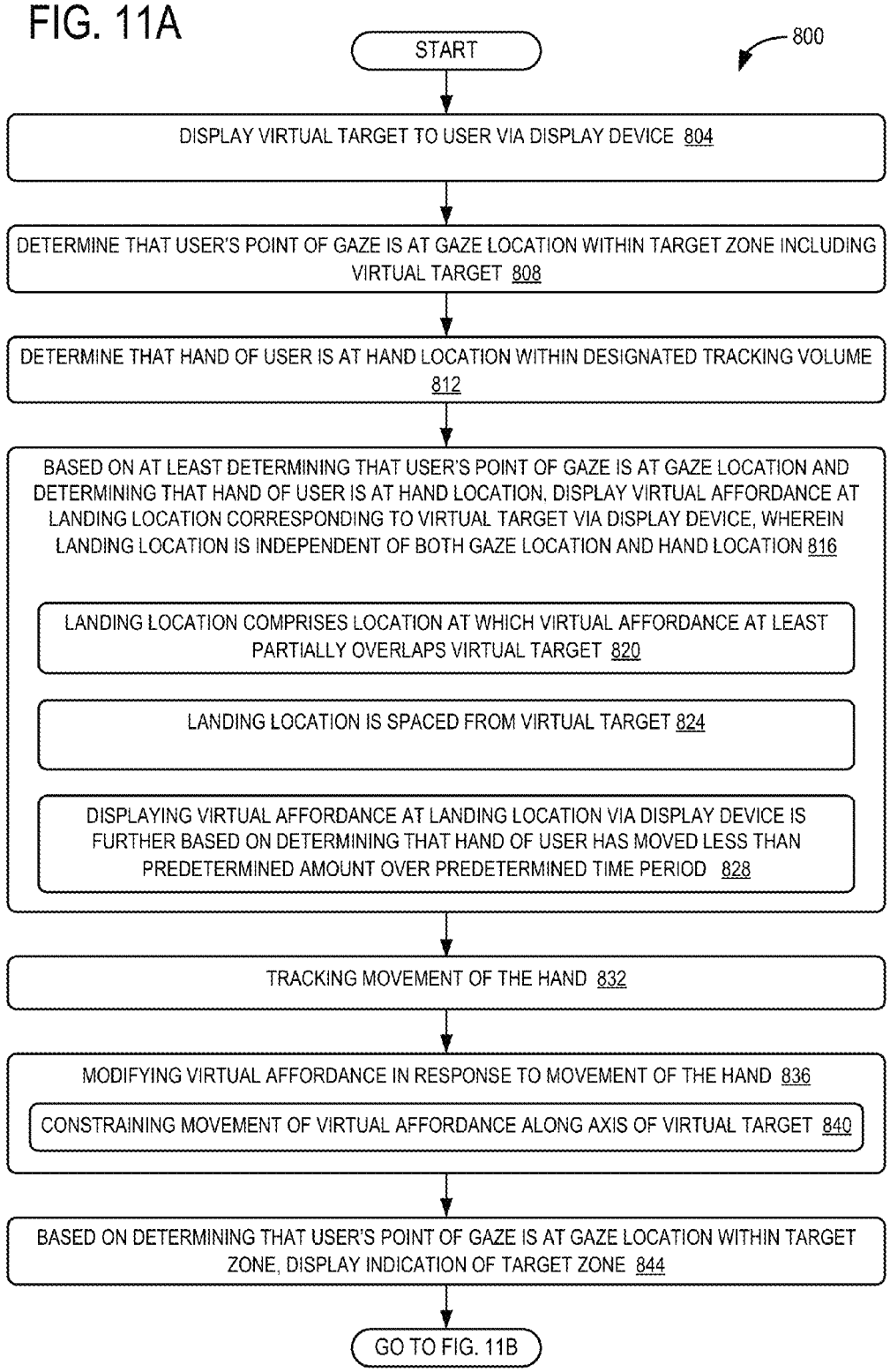
FIGS. 11A, 11B, and 11C are a flow chart of a method for displaying a virtual affordance with a virtual target according to an example of the present disclosure.
Figure 11B:
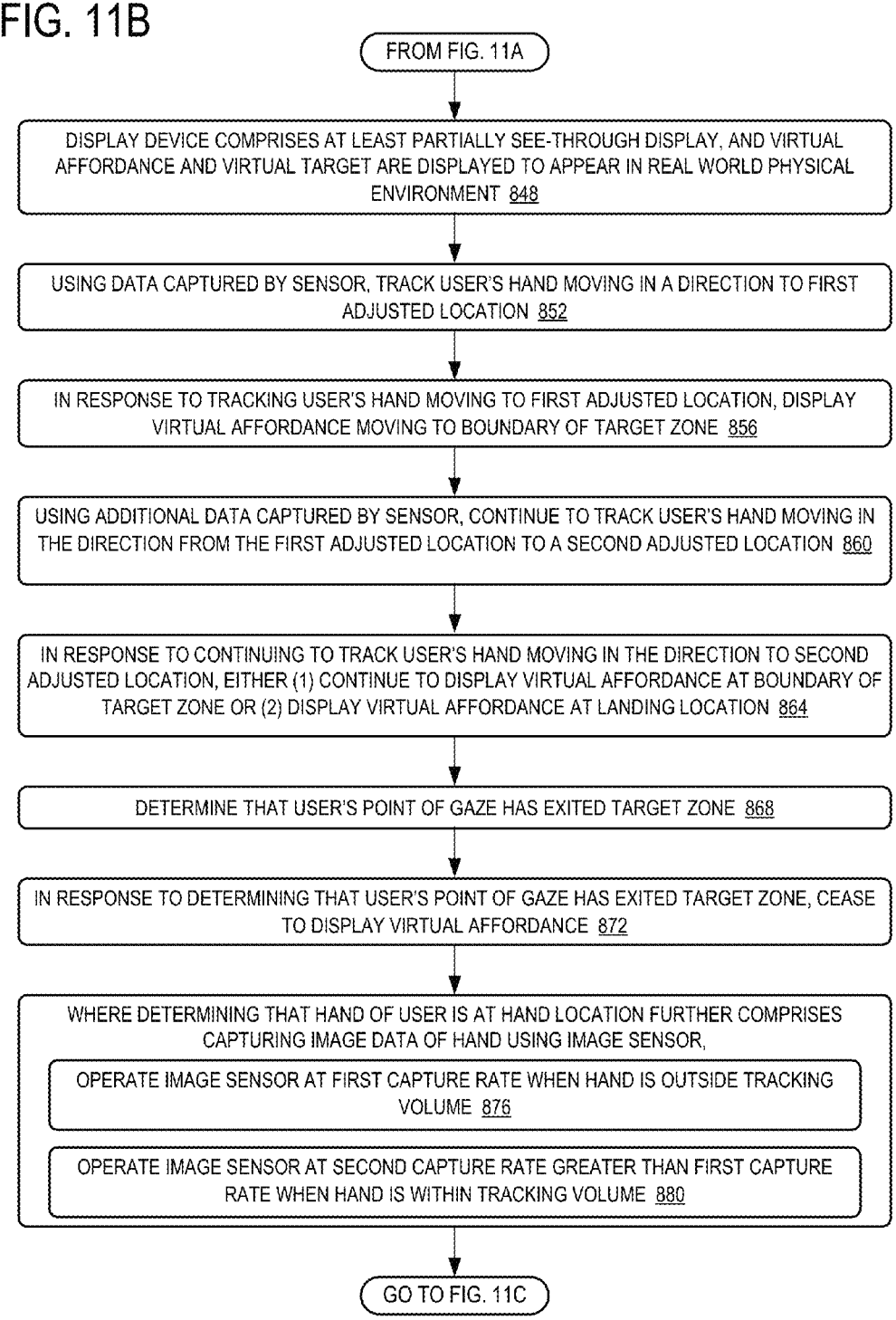
Figure 11C:
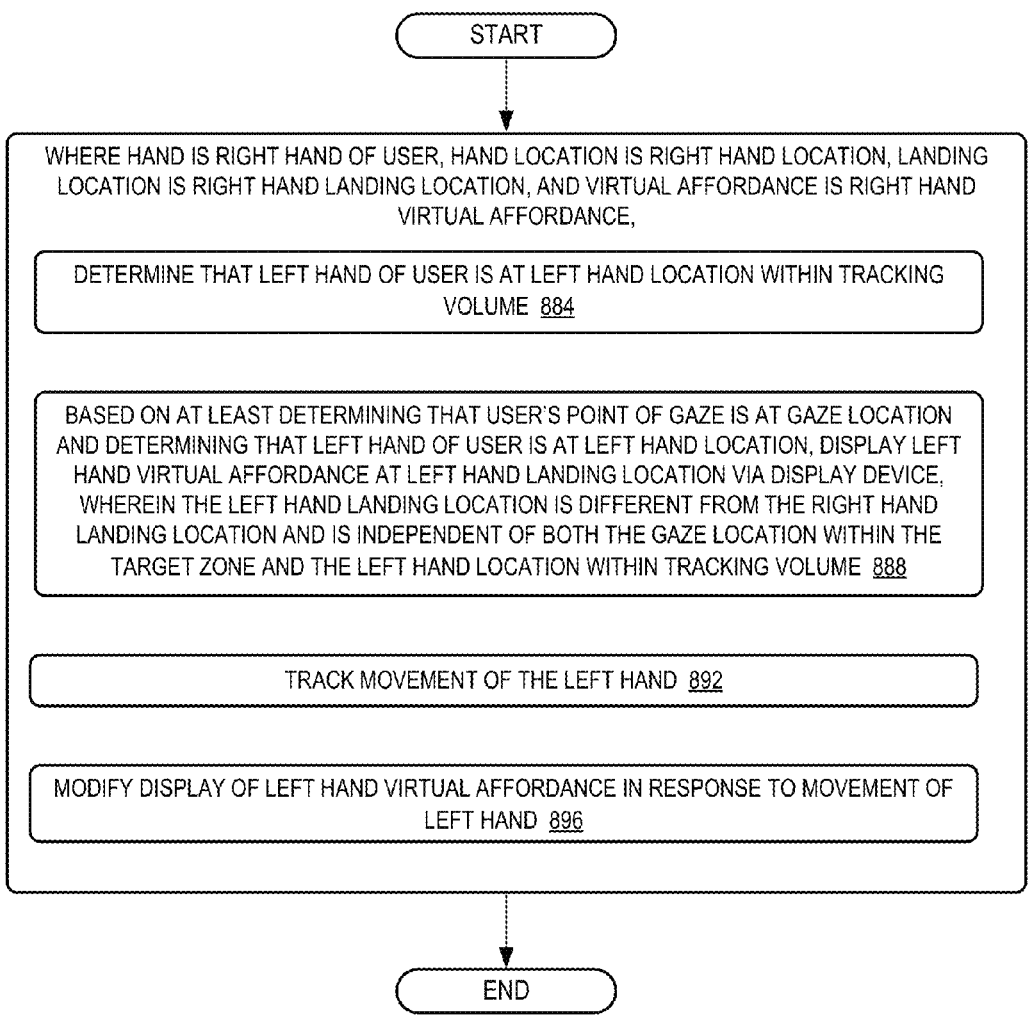

FIGS. 11A, 11B, and 11C illustrate a flow chart of a method 800 for displaying a virtual affordance with a virtual target according to an example of the present disclosure. The following description of method 800 is provided with reference to the software and hardware components described above and shown in FIGS. 1-10. It will be appreciated that method 800 also may be performed in other contexts using other suitable hardware and software components.

With reference to FIG. 11A, at 804 the method 800 may include displaying the virtual target to a user via a display device. At 808 the method 800 may include determining that the user's point of gaze is at a gaze location that is within a target zone including the virtual target. At 812 the method 800 may include determining that a hand of the user is at a hand location within a designated tracking volume. At 816 the method 800 may include, based on at least determining that the user's point of gaze is at the gaze location and determining that the hand of the user is at the hand location, displaying the virtual affordance at a landing location corresponding to the virtual target via the display device, wherein the landing location is independent of both the gaze location within the target zone and the hand location within the designated tracking volume.

At 820 the method 800 may include wherein the landing location comprises a location at which the virtual affordance at least partially overlaps the virtual target. At 824 the method 800 may include wherein the landing location is spaced from a surface of the virtual target. At 828 the method 800 may include wherein displaying the virtual affordance at the landing location via the display device is further based on determining that the hand of the user has moved less than a predetermined amount over a predetermined time period. At 832 the method 800 may include tracking movement of the hand. At 836 the method 800 may include modifying the virtual affordance in response to the movement of the hand.

At 840 the method 800 may include wherein modifying the display of the virtual affordance in response to the movement of the user's hand further comprises constraining movement of the virtual affordance along an axis of the virtual target. At 844 the method 800 may include, based on determining that the user's point of gaze is at the gaze location within the target zone, displaying an indication of the target zone. With reference now to FIG. 11B, at 848 the method 800 may include wherein the display device comprises an at least partially see-through display, and the virtual affordance and the virtual target are displayed to appear in a real world physical environment.

At 852 the method 800 may include, using data captured by a sensor, tracking the user's hand moving in a direction to a first adjusted location. At 856 the method 800 may include, in response to tracking the user's hand moving to the first adjusted location, displaying the virtual affordance moving to a boundary of the target zone. At 860 the method 800 may include, using additional data captured by the sensor, continuing to track the user's hand moving in the direction from the first adjusted location to a second adjusted location. At 864 the method 800 may include, in response to continuing to track the user's hand moving in the direction to the second adjusted location, either (1) continuing to display the virtual affordance at the boundary of the target zone or (2) displaying the virtual affordance at the landing location.

At 868 the method 800 may include determining that the user's point of gaze has exited the target zone. At 872 the method 800 may include, in response to determining that the user's point of gaze has exited the target zone, ceasing to display the virtual affordance. At 876 the method 800 may include, where determining that the hand of the user is at the hand location further comprises capturing image data of the hand using an image sensor, operating the image sensor at a first capture rate when the hand is outside the designated tracking volume. At 880 the method 800 may include operating the image sensor at a second capture rate greater than the first capture rate when the hand of the user is within the designated tracking volume.

With reference now to FIG. 11C, wherein the hand is a right hand of the user, the hand location is a right hand location, the landing location is a right hand landing location, and the virtual affordance is a right hand virtual affordance, at 884 the method 800 may include determining that a left hand of the user is at a left hand location within the designated tracking volume. At 888 the method 800 may include, based on at least determining that the user's point of gaze is at the gaze location and determining that the left hand of the user is at the left hand location, displaying a left hand virtual affordance at a left hand landing location via the display device, wherein the left hand landing location is different from the right hand landing location and is independent of both the gaze location within the target zone and the left hand location within the designated tracking volume. At 892 the method 800 may include tracking movement of the user's left hand. At 896 the method 800 may include modifying the display of the left hand virtual affordance in response to the movement of the user's left hand.

It will be appreciated that method 800 is provided by way of example and is not meant to be limiting. Therefore, it is to be understood that method 800 may include additional and/or alternative steps relative to those illustrated in FIGS. 11A, 11B, and 11C. Further, it is to be understood that method 800 may be performed in any suitable order. Further still, it is to be understood that one or more steps may be omitted from method 800 without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
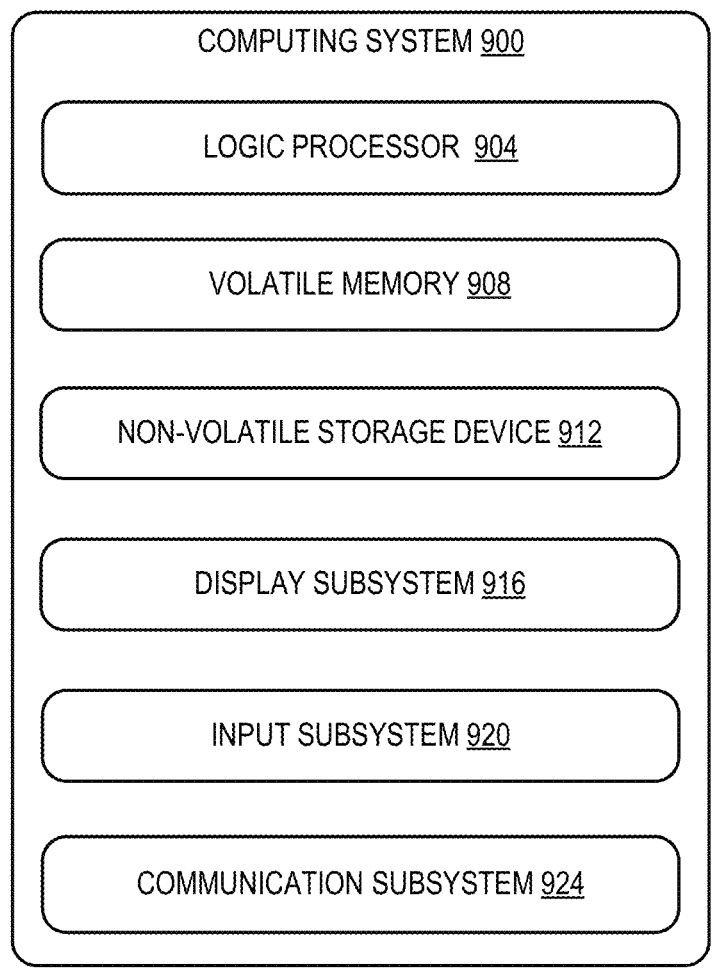
FIG. 12 shows a computing system according to an embodiment of the present disclosure.

FIG. 12 schematically shows a non-limiting embodiment of a computing system 900 that can enact one or more of the methods and processes described above. Computing device 10 and computing device 80 shown in FIG. 1 may take the form of or include one or more aspects of computing system 900. Computing system 900 is shown in simplified form. It is to be understood that virtually any computer architecture may be used without departing from the scope of this disclosure.

Computing system 900 includes a logic processor 904, volatile memory 908, and non-volatile storage device 912. Computing system 900 may optionally include a display subsystem 916, input subsystem 920, communication subsystem 924, and/or other components not shown in FIG. 12.

Logic processor 904 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 904 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 908 may include physical devices that include random access memory. Volatile memory 908 is typically utilized by logic processor 904 to temporarily store information during processing of software instructions. It will be appreciated that volatile memory 908 typically does not continue to store instructions when power is cut to the volatile memory 908.

Non-volatile storage device 912 includes one or more physical devices configured to hold instructions executable by the logic processors to implement the methods and processes described herein. When such methods and processes are implemented, the state of non-volatile storage device 912 may be transformed—e.g., to hold different data.

Non-volatile storage device 912 may include physical devices that are removable and/or built-in. Non-volatile storage device 912 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 912 may include nonvolatile, dynamic, static, read/write, read-only, sequential-access, location-addressable, file-addressable, and/or content-addressable devices. It will be appreciated that non-volatile storage device 912 is configured to hold instructions even when power is cut to the non-volatile storage device 912.

Aspects of logic processor 904, volatile memory 908, and non-volatile storage device 912 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 900 implemented to perform a particular function. In some cases, a program may be instantiated via logic processor 904 executing instructions held by non-volatile storage device 912, using portions of volatile memory 908. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 916 may be used to present a visual representation of data held by non-volatile storage device 912. As the herein described methods and processes change the data held by the non-volatile storage device, and thus transform the state of the non-volatile storage device, the state of display subsystem 916 may likewise be transformed to visually represent changes in the underlying data. Display subsystem 916 may include one or more display devices utilizing virtually any type of technology. Such display devices may be combined with logic processor 904, volatile memory 908, and/or non-volatile storage device 912 in a shared enclosure, or such display devices may be peripheral display devices. Which respect to the example HMD device 18 of FIG. 1, the see-through display 36 configured to visually augment an appearance of a real-world three dimensional physical environment by displaying virtual objects such as holograms is an example of a display subsystem 916.

When included, input subsystem 920 may comprise or interface with one or more user-input devices. In some embodiments, the input subsystem may comprise or interface with selected natural user input (NUI) componentry. Such componentry may be integrated or peripheral, and the transduction and/or processing of input actions may be handled on -or off board. Example NUI componentry may include a microphone for speech and/or voice recognition: and infrared, color, stereoscopic, and/or depth camera for machine vision and/or gesture recognition: a head tracker, eye tracker, accelerometer, inertial measurement unit, and/or gyroscope for motion detection, gaze detection, and/or intent recognition, electric-field sensing componentry for assessing brain activity, any of the sensors described above with respect to HMD device 18, and/or any other suitable sensor.

When included, communication subsystem 924 may be configured to communicatively couple computing system 900 with one or more other computing devices. Communication subsystem 924 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

The following paragraphs provide additional support for the claims of the subject application. One aspect provides a method for displaying a virtual affordance with a virtual target, the method comprising: displaying the virtual target to a user via a display device; determining that a point of gaze of the user is at a gaze location that is within a target zone including the virtual target; determining that a hand of the user is at a hand location within designated tracking volume; based on at least determining that the point of gaze of the user is at the gaze location and determining that the hand of the user is at the hand location, displaying the virtual affordance at a landing location corresponding to the virtual target via the display device, wherein the landing location is independent of both the gaze location within the target zone and the hand location within the designated tracking volume; tracking movement of the hand; and modifying the virtual affordance in response to the movement of the hand. The method may additionally or optionally include, based on determining that the point of gaze of the user is at the gaze location within target zone, displaying an indication of the target zone. The method may additionally or optionally include, wherein displaying the virtual affordance at the landing location via the display device is further based on determining that the hand of the user has moved less than a predetermined amount over a predetermined time period. The method may additionally or optionally include, wherein the landing location comprises a location at which the virtual affordance at least partially overlaps the virtual target. The method may additionally or optionally include, wherein the landing location is spaced from a surface of the virtual target. The method may additionally or optionally include wherein the display device comprises an at least partially see-through display, and the virtual affordance and the virtual target are displayed to appear in a real world physical environment. The method may additionally or optionally include: using data captured by a sensor, tracking the user's hand moving in a direction to a first adjusted location; in response to tracking the user's hand moving to the first adjusted location, displaying the virtual affordance moving to a boundary of the target zone; using additional data captured by the sensor, continuing to track the user's hand moving in the direction from the first adjusted location to a second adjusted location; and in response to continuing to track the user's hand moving in the direction to the second adjusted location, either (1) continuing to display the virtual affordance to the boundary of the target zone or (2) displaying the virtual affordance at the landing location. The method may additionally or optionally include, wherein modifying the display of the virtual affordance in response to the movement of the user's hand further comprises constraining movement of the virtual affordance along an axis of the virtual target. The method may additionally or optionally include: determining that the point of gaze of the user has exited the target zone; and in response to determining that the point of gaze of the user has exited the target zone, ceasing to display the virtual affordance. The method may additionally or optionally include, wherein determining that the hand of the user is at the hand location further comprises capturing image data of the hand using an image sensor, the method further comprising: operating the image sensor at a first capture rate when the hand is outside the designated tracking volume; and operating the image sensor at a second capture rate greater than the first capture rate when the hand of the user is within the designated tracking volume. The method may additionally or optionally include, wherein the hand is a right hand of the user, the hand location is a right hand location, the landing location is a right hand landing location, and the virtual affordance is a right hand virtual affordance, the method further comprising: determining that a left hand of the user is at a left hand location within the designated tracking volume; based on at least determining that the point of gaze of the user is at the gaze location and determining that the left hand of the user is at the left hand location, displaying a left hand virtual affordance at a left hand landing location via the display device, wherein the left hand landing location is different from the right hand landing location and is independent of both the gaze location within the target zone and the left hand location within the designated tracking volume; tracking movement of the user's left hand; and modifying the display of the left hand virtual affordance in response to the movement of the user's left hand.

Another aspect provides a computing device for displaying a virtual affordance with virtual target, the computing device comprising: a processor; and a memory holding instructions executable by the processor to: display the virtual target to a user via a display device; determine that a point of gaze of the user is at a gaze location that is within a target zone including the virtual target; determine that a hand of the user is at a hand location within a designated tracking volume; based on at least determining that the point of gaze of the user is at the gaze location and determining that the hand of the user is at the hand location, display the virtual affordance at the landing location via the display device, wherein the landing location is independent of both the gaze location within the target zone and the hand location within the designated tracking volume; track movement of the hand; and modify the virtual affordance in response to the movement of the hand. The computing device may additionally or alternatively include, wherein the instructions are further executable to establish the landing location at a location at which the virtual affordance at least partially overlaps the virtual target. The computing device may additionally or alternatively include, wherein the instructions are further executable to display an indication of the target zone based on determining that the point of gaze of the user is at the gaze location within the target zone. The computing device may additionally or alternatively include, wherein displaying the virtual affordance at the landing location via the display device is further based on determining that the hand of the user has moved less than a predetermined amount over a predetermined time period. The computing device may additionally or alternatively include, wherein the instructions are further executable to: using data captured by a sensor, track the user's hand moving in a direction to a first adjusted location; in response to tracking the user's hand moving to the first adjusted location, display the virtual affordance moving to a boundary of the target zone; using additional data captured by the sensor, continue to track the user's hand moving in the direction from the first adjusted location to a second adjusted location; and in response to continuing to track the user's hand moving in the direction to the second adjusted location, either (1) continue to display the virtual affordance at the boundary of the target zone or (2) display the virtual affordance at the landing location. The computing device may additionally or alternatively include, wherein modifying the display of the virtual affordance in response to the movement of the user's hand further comprises constraining movement of the virtual affordance along an axis of the virtual target. The computing device may additionally or alternatively include, wherein determining that the hand of the user is at the hand location further comprises capturing image data of the hand using an image sensor, and the instructions are further executable to: operate the image sensor at a first capture rate when the hand is outside the designated tracking volume; and operate the image sensor at a second capture rate greater than the first capture rate when the hand of the user is within the designated tracking volume. The computing device may additionally or alternatively include, wherein the hand is a right hand of the user, the hand location is a right hand location, the landing location is a right hand landing location, and the virtual affordance is a right hand virtual affordance, and the instructions are further executable to: determine that a left hand of the user is at a left hand location within the designated tracking volume; based on at least determining that the point of gaze of the user is at the gaze location and determining that the left hand of the user is at the left hand location, display a left hand virtual affordance at a left hand landing location via the display device, wherein the left hand landing location is different from the right hand landing location and is independent of both the gaze location within the target zone and the left hand location within the designated tracking volume; track movement of the user's left hand; and modify the display of the left hand virtual affordance in response to the movement of the user's left hand.

Another aspect provides a head-mounted display device, comprising: an at least partially see-through display; a processor; and a memory holding instructions executable by the processor to; display a virtual target to a user via a display device: determine that a point of gaze of the user is at a gaze location that is within a target zone including the virtual target; determine that a hand of the user is at a hand location within a designated tracking volume; based on at least determining that the point of gaze of the user is at the gaze location and determining that the hand of the user is at the hand location, display the virtual affordance at a landing location via the display device, wherein the landing location is independent of both the gaze location within the target zone and the hand location within the designated tracking volume; track movement of the hand; and modify the virtual affordance in response to the movement of the hand.

It will be understood that the configurations and/or approaches described herein are exemplary in nature, and that these specific embodiments or examples are not to be considered in a limiting sense, because numerous variations are possible. The specific routines or methods described herein my represent one or more of any number of processing strategies. As such, various acts illustrated and/or described may be performed in the sequence illustrated and/or described, in other sequences, in parallel, or omitted. Likewise, the order of the above -described processes may be charged.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for displaying a virtual affordance with a virtual target, the method comprising:
    displaying the virtual target to a user via a display device;
    determining that a point of gaze of the user is at a gaze location that is within a target zone including the virtual target;
    determining that a hand of the user is at a hand location within a designated tracking volume;
    based on at least determining that the point of gaze of the user is at the gaze location and determining that the hand of the user is at the hand location, displaying the virtual affordance at a landing location corresponding to the virtual target via the display device, wherein the landing location is independent of both the gaze location within the target zone and the hand location within the designated tracking volume;
    tracking movement of the hand; and
    modifying the virtual affordance in response to the movement of the hand.

2. The method of claim 1, further comprising, based on determining that the point of gaze of the user is at the gaze location within the target zone, displaying an indication of the target zone.

3. The method of claim 1, wherein displaying the virtual affordance at the landing location via the display device is further based on determining that the hand of the user has moved less than a predetermined amount over a predetermined time period.

4. The method of claim 1, wherein the landing location comprises a location at which the virtual affordance at least partially overlaps the virtual target.

5. The method of claim 1, wherein the landing location is spaced from a surface of the virtual target.

6. The method of claim 1, wherein the display device comprises an at least partially see-through display, and the virtual affordance and the virtual target are displayed to appear in a real world physical environment.

7. The method of claim 1, further comprising:
    using data captured by a sensor, tracking the user's hand moving in a direction to a first adjusted location;
    in response to tracking the user's hand moving to the first adjusted location, displaying the virtual affordance moving to a boundary of the target zone;
    using additional data captured by the sensor, continuing to track the user's hand moving in the direction from the first adjusted location to a second adjusted location; and
    in response to continuing to track the user's hand moving in the direction to the second adjusted location, either (1) continuing to display the virtual affordance at the boundary of the target zone or (2) displaying the virtual affordance at the landing location.

8. The method of claim 1, wherein modifying the display of the virtual affordance in response to the movement of the user's hand further comprises constraining movement of the virtual affordance along an axis of the virtual target.

9. The method of claim 1, further comprising:
    determining that the point of gaze of the user has exited the target zone; and
    in response to determining that the point of gaze of the user has exited the target zone, ceasing to display the virtual affordance.

10. The method of claim 1, wherein determining that the hand of the user is at the hand location further comprises capturing image data of the hand using an image sensor, the method further comprising:
    operating the image sensor at a first capture rate when the hand is outside the designated tracking volume; and
    operating the image sensor at a second capture rate greater than the first capture rate when the hand of the user is within the designated tracking volume.

11. The method of claim 1, wherein the hand is a right hand of the user, the hand location is a right hand location, the landing location is a right hand landing location, and the virtual affordance is a right hand virtual affordance, the method further comprising:
    determining that a left hand of the user is at a left hand location within the designated tracking volume;
    based on at least determining that the point of gaze of the user is at the gaze location and determining that the left hand of the user is at the left hand location, displaying a left hand virtual affordance at a left hand landing location via the display device, wherein the left hand landing location is different from the right hand landing location and is independent of both the gaze location within the target zone and the left hand location within the designated tracking volume;
    tracking movement of the user's left hand; and
    modifying the display of the left hand virtual affordance in response to the movement of the user's left hand.

12. A computing device for displaying a virtual affordance with a virtual target, the computing device comprising:
    a processor; and
    a memory holding instructions executable by the processor to:
        display the virtual target to a user via a display device;
        determine that a point of gaze of the user is at a gaze location that is within a target zone including the virtual target;
        determine that a hand of the user is at a hand location within a designated tracking volume;
        based on at least determining that the point of gaze of the user is at the gaze location and determining that the hand of the user is at the hand location, display the virtual affordance at the landing location via the display device, wherein the landing location is independent of both the gaze location within the target zone and the hand location within the designated tracking volume;

track movement of the hand; and modify the virtual affordance in response to the movement of the hand.

13. The computing device of claim 12, wherein the instructions are further executable to establish the landing location at a location at which the virtual affordance at least partially overlaps the virtual target.

14. The computing device of claim 12, wherein the instructions are further executable to display an indication of the target zone based on determining that the point of gaze of the user is at the gaze location within the target zone.

15. The computing device of claim 12, wherein displaying the virtual affordance at the landing location via the display device is further based on determining that the hand of the user has moved less than a predetermined amount over a predetermined time period.

16. The computing device of claim 12, wherein the instructions are further executable to:

using data captured by a sensor, track the user's hand moving in a direction to a first adjusted location;

in response to tracking the user's hand moving to the first adjusted location, display the virtual affordance moving to a boundary of the target zone;

using additional data captured by the sensor, continue to track the user's hand moving in the direction from the first adjusted location to a second adjusted location; and in response to continuing to track the user's hand moving in the direction to the second adjusted location, either (1) continue to display the virtual affordance at the boundary of the target zone or (2) display the virtual affordance at the landing location.

17. The computing device of claim 12, wherein modifying the display of the virtual affordance in response to the movement of the user's hand further comprises constraining movement of the virtual affordance along an axis of the virtual target.

18. The computing device of claim 12, wherein determining that the hand of the user is at the hand location further comprises capturing image data of the hand using an image sensor, and the instructions are further executable to:

operate the image sensor at a first capture rate when the hand is outside the designated tracking volume; and operate the image sensor at a second capture rate greater than the first capture rate when the hand of the user is within the designated tracking volume.

19. The computing device of claim 12, wherein the hand is a right hand of the user, the hand location is a right hand location, the landing location is a right hand landing location, and the virtual affordance is a right hand virtual affordance, and the instructions are further executable to:

determine that a left hand of the user is at a left hand location within the designated tracking volume;

based on at least determining that the point of gaze of the user is at the gaze location and determining that the left hand of the user is at the left hand location, display a left hand virtual affordance at a left hand landing location via the display device, wherein the left hand landing location is different from the right hand landing location and is independent of both the gaze location within the target zone and the left hand location within the designated tracking volume;

track movement of the user's left hand; and modify the display of the left hand virtual affordance in response to the movement of the user's left hand.

20. A head-mounted display device, comprising:

an at least partially see-through display;

a processor; and a memory holding instructions executable by the processor to:

display a virtual target to a user via the display;

determine that a point of gaze of the user is at a gaze location that is within a target zone including the virtual target;

determine that the hand of the user is at a hand location within a designated tracking volume;

based on at least determining that the point of gaze of the user is at the gaze location and determining that the hand of the user is at the hand location, display the virtual affordance at a landing location via the display device, wherein the landing location is independent of both the gaze location within the target zone and the hand location within the designated tracking volume;

track movement of the hand; and modify the virtual affordance in response to the movement of the hand.

* * * * *